(12) United States Patent  
Tanaka et al.

(10) Patent No.: US 9,428,172 B2  
(45) Date of Patent: Aug. 30, 2016

(54) MOTOR DRIVE CONTROL DEVICE

(71) Applicants: MICROSPACE CORPORATION, Tokyo (JP); TAIYO YUDEN CO., LTD., Tokyo (JP)

(72) Inventors: Masato Tanaka, Tokyo (JP); Kazuo Asanuma, Tokyo (JP); Yasuo Hosaka, Tokyo (JP); Kuniaki Kawagoe, Tokyo (JP)

(73) Assignees: MICROSPACE CORPORATION, Tokyo (JP); TAIYO YUDEN CO., LTD., Tokyo (JP)

( * ) Notice: Subject to any disclaimer, the term of this patent is extended or adjusted under 35 U.S.C. 154(b) by 281 days.

(21) Appl. No.: 13/887,123

(22) Filed: May 3, 2013

(65) Prior Publication Data

US 2013/0317679 A1    Nov. 28, 2013

(30) Foreign Application Priority Data

May 28, 2012    (JP) .................. 2012-120480

(51) Int. Cl.
*B60W 10/08*    (2006.01)
*B60W 10/02*    (2006.01)
(Continued)

(52) U.S. Cl.
CPC ............. *B60W 10/08* (2013.01); *B60L 7/14* (2013.01); *B60L 11/005* (2013.01); *B60L 11/007* (2013.01); *B60L 11/1861* (2013.01);
(Continued)

(58) Field of Classification Search
CPC .......... B60L 2200/12; B60L 11/007; B60L 2240/423; B60L 11/1805; B60L 2250/26; B60L 2240/421; B60W 10/08; B60W 10/02; B60W 10/00

USPC .......... 701/22, 70, 84; 180/206.2, 206.4, 180/206.5; 318/3, 300, 139, 461
See application file for complete search history.

(56) References Cited

U.S. PATENT DOCUMENTS 5,329,455 A * 7/1994 Oo et al. .................. 701/93
5,375,676 A * 12/1994 Takata et al. ........... 180/206.4
(Continued)

FOREIGN PATENT DOCUMENTS

DE    20 2011 004525 U1    12/2011
EP    0 559 231 A1    9/1993
(Continued)

OTHER PUBLICATIONS

European Search Report dated Sep. 5, 2013, in a counterpart European patent application No. 13002666.9.
(Continued)

*Primary Examiner* — Jelani Smith
(74) *Attorney, Agent, or Firm* — Chen Yoshimura LLP

(57) ABSTRACT

An appropriate motor control in accordance with a pedal operation of a driver is to be achieved. A motor drive control device according to the present invention is a motor drive control device for an electric power-assisted vehicle that has one-way clutches respectively provided for a motor drive system and for a pedal drive system. The motor drive control device according to the present invention includes: a first calculating part that calculates a pedal rotation conversion speed that is converted from a pedal rotation; and a second calculating part that calculates a second target torque for a motor based on the pedal rotation conversion speed, during a period in which a first target torque derived from a pedal torque is not detected.

11 Claims, 20 Drawing Sheets

(51) Int. Cl.
*B62M 6/45* (2010.01)
*B60L 7/14* (2006.01)
*B60L 11/00* (2006.01)
*B60L 11/18* (2006.01)
*B60L 15/20* (2006.01)

(52) U.S. Cl.
CPC ......... *B60L 15/2009* (2013.01); *B60W 10/02* (2013.01); *B62M 6/45* (2013.01); *B60L 2200/12* (2013.01); *B60L 2220/44* (2013.01); *B60L 2240/12* (2013.01); *B60L 2240/421* (2013.01); *B60L 2240/423* (2013.01); *B60L 2240/525* (2013.01); *B60L 2250/24* (2013.01); *B60L 2250/26* (2013.01); *B60L 2270/145* (2013.01); *Y02T 10/645* (2013.01); *Y02T 10/7005* (2013.01); *Y02T 10/705* (2013.01); *Y02T 10/7022* (2013.01); *Y02T 10/7044* (2013.01); *Y02T 10/72* (2013.01); *Y02T 10/7275* (2013.01)

(56) References Cited

U.S. PATENT DOCUMENTS

| | | | | |
|---|---|---|---|---|
| 5,836,414 A | * | 11/1998 | Seto et al. | 180/206.1 |
| 5,910,714 A | * | 6/1999 | Buchanan et al. | 318/139 |
| 5,979,924 A | * | 11/1999 | D'Aluisio et al. | 280/261 |
| 6,320,336 B1 | * | 11/2001 | Eguchi | 318/139 |
| 6,465,977 B1 | * | 10/2002 | Farkas et al. | 318/432 |
| 2004/0206563 A1 | | 10/2004 | Murata | |
| 2010/0148713 A1 | * | 6/2010 | Chen et al. | 318/465 |
| 2012/0083957 A1 | * | 4/2012 | Aoki et al. | 701/22 |

FOREIGN PATENT DOCUMENTS

| | | |
|---|---|---|
| JP | H01 314685 A | 12/1989 |
| JP | H9-328092 A | 12/1997 |
| JP | H11 99983 A | 4/1999 |
| JP | H11-105776 A | 4/1999 |
| JP | 2002 264882 A | 9/2002 |
| JP | 3327874 B2 | 9/2002 |
| JP | 2011-57057 A | 3/2011 |

OTHER PUBLICATIONS

Japanese Office Action dated Jan. 28, 2014 in a counterpart Japanese patent application No. 2012-120480.

* cited by examiner

| State | Running State Number | First-order Gain Gvs1 |
|---|---|---|
| Assist Torque Control (Vicinity) | (1),(8) | 0 |
| Servo Control (Vicinity) (Pedal Tracking upon Disengaging) | (2),(6) | 1/8 |
| Servo Control (Non-vicinity, Acceleration (Vmer>0)) (Pedal Tracking upon Disengaging) | (3)–U,(7) | 1/2 |
| Servo Control (Non-vicinity, Deceleration (Vmer≤0)) (Pedal Tracking upon Disengaging) | (3)–D,(4),(5) | 1/8 |

FIG. 14

| State | Running State Number | First-order Gain Gvs1 | Second-order Gain Gvs2 |
|---|---|---|---|
| In (Duty Cycle /Motor Speed) Coefficient Auto-calibration Process A (Initial Stage) | (9) | 1 | 0 |
| In (Duty Cycle /Motor Speed) Coefficient Auto-calibration Process A (After Temporary Convergence) | (9) | 1/4 | 1/16 |
| In (Duty Cycle /Motor Speed) Coefficient Auto-calibration Process B (Always) | (9) | 1/2 | 1/32 |

FIG. 18

MOTOR DRIVE CONTROL DEVICE

This application claims the benefit of Japanese Application No. 2012-120480, filed in Japan on May 28, 2012, which is hereby incorporated by reference in its entirety.

BACKGROUND OF THE INVENTION

1. Field of the Invention

The present invention relates to a motor drive control device for an electric power-assisted vehicle such as a bicycle with a motor.

2. Description of Related Art

Power transmission systems of an electric power-assisted vehicle such as a bicycle with a motor include various configurations shown in FIGS. 1 to 6. In the figures, OWC represents a one-way clutch, and a reduction gear may or may not be provided depending on the motor torque and speed characteristics. R gear represents a rear gear, and F gear represents a front gear. The chain is an example, and the same effect can be achieved when other appropriate parts such as a rotary shaft are used.

A difference between an example that uses a variable transmission (FIG. 1) and an example that uses a external gear shifter (FIG. 2) is illustrated only with the first power transmission system in FIGS. 1 and 2. As seen from the comparison between FIG. 1 and FIG. 2, the only difference between the system with the variable transmission and the system with the external gear shifter is that the gear shifter and the OWC are replaced with each other. Therefore, for other power transmission systems, configurations with a variable transmission will only be shown.

In the first power transmission system shown in FIGS. 1 and 2, the front wheel motor drives the front wheel on the ground through no OWC, and an electromagnetic (regenerative) brake can be used. However, even when pedals are not rotated, load is constantly applied by the motor, which increases a constant loss. Also, when the battery is out of charge, the vehicle including such motor load needs to be driven by human power.

On the other hand, respective configurations of the second power transmission system (FIG. 3) to the fifth power transmission system (FIG. 6) are provided with an OWC in a drive route from the motor to the ground. This OWC is either independently provided, or is shared with the pedals. Therefore, when the pedals are not rotated, the motor load does not affect the driving.

In cases of the second and third power transmission systems (FIGS. 3 and 4), the OWC is shared between the motor and the pedals, and because the pedals and the motor are constantly in mechanical synchronization, the OWC is locked and unlocked by a manual pedal operation. Therefore, uncomfortable feeling or a shock to the motor is not caused by the OWC upon locking.

In the fourth power transmission system (FIG. 5), the OWC is provided between the motor and the front wheel, and another OWC is independently provided between the pedals and the rear wheel. In the fifth power transmission system (FIG. 6), both the motor and the pedals drive the rear wheel, but the OWC for the motor and the OWC for the pedals are provided independently from each other.

As described above, in the fourth and fifth power transmission systems, not only an assist operation by the motor is possible, but also the vehicle can be driven by the motor alone, which achieves a function of an electric motorcycle. However, in the aspect of the assist operation, because the motor and the pedals are not mechanically synchronized, when a manual operation to lock and unlock the OWC and a motor operation to lock and unlock the OWC do not occur at the same time, shock and noise are possibly caused. Such a shock results in wear and damage of the motor and the reduction gear.

A conventional technique discloses a control method for a bicycle with an electric motor including one-way clutches respectively provided for the pedals and for the motor and another one-way clutch to be shared between pedals and motor. In this control method, when a force on the pedal is substantially zero, the electric motor is maintained at a no-load rotational speed that corresponds to a vehicle speed at that time, and when the force on the pedal is not substantially zero, the driving force of the motor is controlled in accordance with the force on the pedal. In this conventional technique, the actual vehicle speed is measured, and the motor rotational speed is maintained at a no-load rotational speed that corresponds to the vehicle speed. This makes it possible to prevent a delay in an assist operation when it is needed.

However, this conventional technique can be interpreted to substantially describe only the technical matters that are necessary to maintain a voltage for a no-load rotational speed that corresponds to a vehicle speed. That is, in such a state, a driving force (i.e., torque) is not controlled at all. More specifically, it can be interpreted that the above disclosure describes a system in which a desired rotational speed can be obtained by the internal feedback effect, which is, when outputting a driving voltage that corresponds to a no-load rotational speed, a difference between the driving voltage and a back electromotive force in the motor causes an internal current to flow in proportion to the coil resistance, thereby generating torque. With this configuration, it is not possible to ensure that an appropriate motor drive control is conducted in accordance with a pedaling operation of the rider. Also, because an object of the disclosure is to prevent a delay in assist operation, the disclosure does not provide a solution to the problem of a gap between timing of locking and unlocking the OWC by the pedals and timing of locking and unlocking the OWC by the motor.

RELATED ART DOCUMENT

Patent Document

Patent Document 1: Japanese Patent No. 3327874

SUMMARY OF THE INVENTION

In one aspect, an object of the present invention is to provide a technique that realizes an appropriate motor control in accordance with a pedaling operation of a rider.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present invention provides a motor drive control device for an electric power-assisted vehicle that has one-way clutches respectively provided for a motor drive system and for a pedal drive system, the motor drive control device including: a first calculating part that calculates a pedal rotation conversion speed that is converted from pedal rotations; and a second calculating part that calculates a second target torque for a motor in accordance with the pedal rotation conversion speed during a period in which a first target torque that is calculated based on a pedal torque is not detected.

With this configuration, an appropriate motor control in accordance with a pedaling operation is made possible.

The second calculating part described above may calculate a second target torque for a motor based on a difference between a motor speed and a target motor speed that is the smaller of the pedal rotation conversion speed and a vehicle speed. This makes it possible to perform appropriate speed tracking.

Further, the second calculating part described above may calculate a second target torque based on a first target torque during a period in which the first target torque is detected.

The motor drive control device may further include: a first processing part that generates a first value by converting a motor rotational speed into a duty cycle; a second processing part that generates a second value by converting a target torque into a duty cycle; and a driver that controls switching of a switch included in a complimentary switching amplifier with an average duty cycle derived from a sum of the first value and the second value, to drive a motor that is connected to the complimentary switching amplifier. With such a feed-forward control, a stable control can be performed.

The second calculating part may, immediately after a first target torque is detected, outputs a second target torque while changing a value thereof from the first value calculated based on the pedal rotation conversion speed to the second value calculated based on a pedal torque. This makes it possible to avoid a sudden change in the second target torque.

The second calculating part described above may raise the first value to the second value at a fixed slew rate when the first value calculated based on the pedal rotation conversion speed is smaller than the second value calculated based on a pedal torque.

When a difference between a target motor speed and a motor rotational speed is a negative value, the second calculating part described above may multiply the difference between the target motor speed and the motor rotational speed by a gain that is less than 1 and that is smaller than that of a case in which the difference between the target motor speed and the motor rotational speed is a positive value. This is because, when the difference between the target motor speed and the motor rotational speed is a positive value, the vehicle is accelerating, and therefore, it is preferable to increase the motor speed to the vehicle speed faster than the case of deceleration.

The second calculating part described above may stop the motor when the difference between the target motor speed and the motor rotational speed is a negative value, or when pedaling is stopped. This is because it is possible to save energy by making the vehicle naturally decelerate.

When the absolute value of the difference between the target motor speed and the motor rotational speed is less than a prescribed value, the second calculating part described above may multiply the difference between the target motor speed and the motor rotational speed with a gain that is equal to or smaller than that of when the absolute value of the difference between the target motor speed and the motor rotational speed is the prescribed value or greater. This makes it possible to prevent a shock upon locking the motor to the clutch, which results from a rapid increase in motor rotational speed.

When the absolute value of the difference between the target motor speed and the motor rotational speed is less than a prescribed value, the second calculating part described above may output, as the second target torque, the smaller of the first value calculated based on the difference between the target motor speed and the motor rotational speed and a prescribed second value. This makes it possible to prevent a shock that occurs when the motor is locked into the clutch.

Further, the above-mentioned electric power-assisted vehicle may be an electric power-assisted vehicle that does not have a variable transmission or that drives wheels through a variable transmission that is shared between the pedal and the motor. In this case, when the absolute value of the difference between the pedal rotation conversion speed and the motor rotational speed is less than a prescribed value, the difference between the pedal rotation conversion speed and the motor rotational speed may be multiplied by a gain that is smaller than that of when the absolute value of the difference between the pedal rotation conversion speed and the motor rotational speed is the prescribed value or greater.

Further, the above-mentioned pedal rotation conversion speed may be calculated from the pedal rotational speed based on a gear ratio for the fastest speed. This is effective when a gear ratio cannot be detected and the like.

Also, during a period in which the first target torque is not detected, the second target torque may be calculated such that the motor speed reaches a prescribed speed at a prescribed timing. In this case, the motor drive control device of the present invention may further include a coefficient calibrating part that conducts a process of calibrating a coefficient that is used for converting the motor rotational speed to a duty cycle. This makes it possible to appropriately set the coefficient.

A program that makes a microprocessor execute the above-mentioned processes can be written, and the program is stored in a computer-readable storage or a storage unit such as a flexible disk, an optical disk such as CD-ROM, an magneto-optical disk, a semiconductor memory (ROM, for example), and a hard disk. Data during the process is temporarily stored in a storage device such as a RAM (random access memory).

According to one aspect of the present invention, an appropriate motor control in accordance with a pedaling operation of a rider is made possible.

BRIEF DESCRIPTION OF THE DRAWINGS

FIG. 14 is a diagram showing a relationship among a state, a first-order gain, and a running state.

FIG. 18 is a diagram showing a relationship among a gain, a state, and a running state in a coefficient auto-calibration process.

DETAILED DESCRIPTION OF THE PREFERRED EMBODIMENTS

Figure 7:
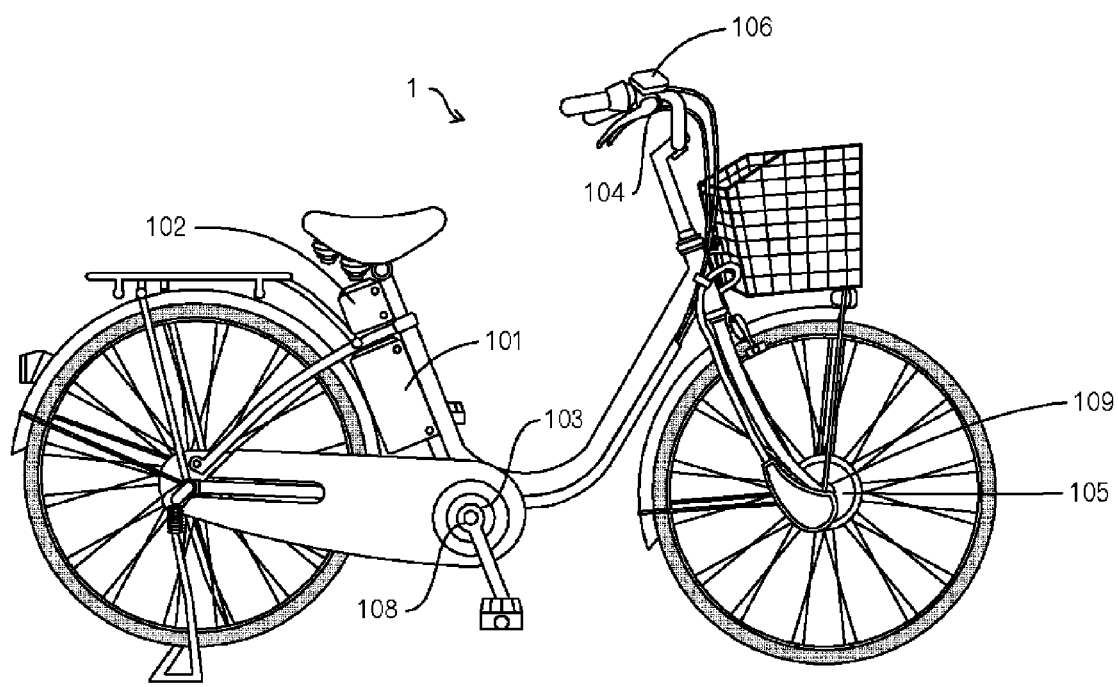
FIG. 7 is a drawing that shows one example of an electric power-assisted vehicle.

FIG. 7 is an external view that shows a bicycle with a motor, which is an example of an electric power-assisted vehicle according to the present embodiment. A bicycle 1 with a motor has a power transmission system shown in FIG. 5, for example, and is a typical rear-wheel drive bicycle in which the crankshaft and the rear wheel are connected through a chain.

The bicycle 1 with a motor has a motor drive device. The motor drive device has a secondary battery 101, a motor drive controller 102, a torque sensor 103, a brake sensor 104, a motor 105, a control panel 106, a pedal rotation sensor 108, and a front wheel rotation sensor 109.

The secondary battery 101 is a lithium ion secondary battery in which the maximum supply voltage (voltage when fully charged) is 24V, for example, but the secondary battery 101 may be another type of battery such as a lithium ion polymer secondary battery, a nickel-metal hydride rechargeable battery, or a large-capacity capacitor such as an electrical double-layered capacitor.

The torque sensor 103, which is provided in a wheel installed on the crankshaft, detects force on the pedal by a rider, and outputs the result thereof to the motor drive controller 102. Similarly, the pedal rotation sensor 108 is provided in a wheel installed on the crankshaft, like the torque sensor 103, and outputs a signal based on the rotations to the motor drive controller 102. Further, the front wheel rotation sensor 109 outputs a signal based on the rotations of the front wheel to the motor drive controller 102.

The brake sensor 104 is constituted of a magnet and a known reed switch. The magnet is fixed to a brake wire connected to a brake lever in a case in which the brake lever is fixed and through which the brake wire passes. The brake lever is designed so as to switch the reed switch on when gripped by a hand. Also, the reed switch is fixed inside the case. An ON signal of the reed switch is sent to the motor drive controller 102.

The motor 105 is a known three phase brushless motor, for example, and is installed on the front wheel of the bicycle 1 with a motor, for example. The motor 105 rotates the front wheel, and a rotor is connected to the front wheel so as to rotate when the front wheel rotates. In addition, the motor 105 is provided with a rotation sensor such as a Hall element and outputs rotation information of the rotor (in other words, a Hall signal) to the motor drive controller 102.

The control panel 106 receives command input from the user on whether or not to assist, for example, and outputs the command input to the motor drive controller 102. The control panel 106 receives settings input on the assist ratio (the assist ratio at the M position; also referred to as a desired assist ratio) from the user and outputs the settings input to the motor drive controller 102. In some cases, a signal that represents a gear ratio is also outputted to the motor drive controller 102 from a variable transmission and the like.

Figure 8:
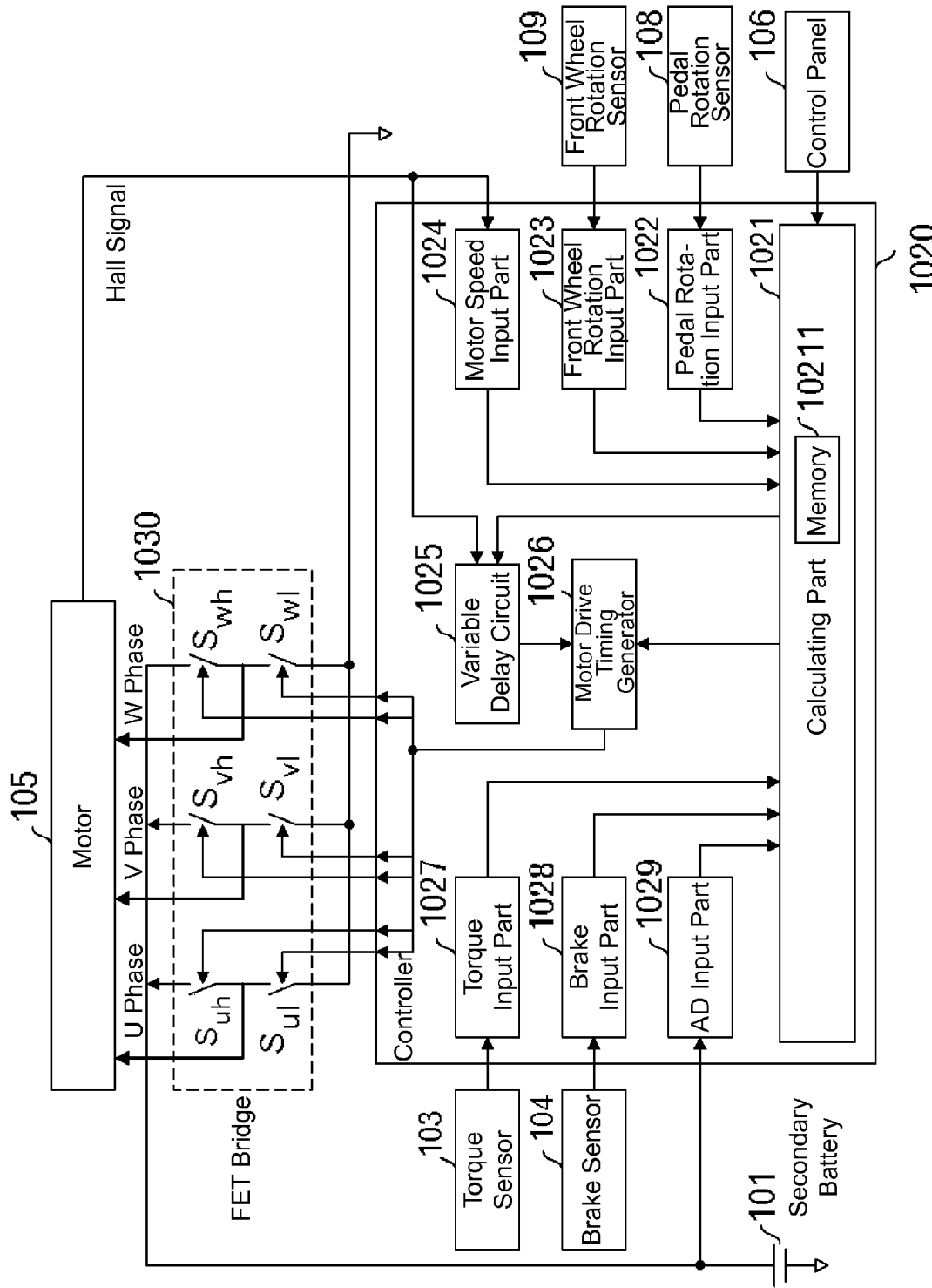
FIG. 8 is a block diagram of functions relating to a motor drive control device.

A configuration of the motor drive controller 102 of the bicycle 1 with a motor is shown in FIG. 8. The motor drive controller 102 has a controller 1020 and an FET (field effect transistor) bridge 1030. The FET bridge 1030 includes a high-side FET ($S_{uh}$) and a low-side FET ($S_{ul}$) that perform switching for the U phase of the motor 105, a high-side FET ($S_{vh}$) and a low-side FET ($S_{vl}$) that perform switching for the V phase of the motor 105, and a high-side FET ($S_{wh}$) and a low-side FET ($S_{wl}$) that perform switching for the W phase of the motor 105. The FET bridge 1030 constitutes a portion of the complementary switching amplifier.

Also, the controller 1020 has a calculating part 1021, a pedal rotation input part 1022, a front wheel rotation input part 1023, a motor speed input part 1024, a variable delay circuit 1025, a motor drive timing generator 1026, a torque input part 1027, a brake input part 1028, and an AD input part 1029.

The calculating part 1021 outputs calculation results to the motor drive timing generator 1026 and the variable delay circuit 1025 after performing a calculation described below using an input from the control panel 106 (for example, ON/OFF and operation mode (assist ratio, for example)), an input from the pedal rotation input part 1022, an input from the front wheel rotation input part 1023, an input from the motor speed input part 1024, an input from the torque input part 1027, an input from the brake input part 1028, and an input from the AD input part 1029. The calculating part 1021 has a memory 10211, and the memory 10211 stores various types of data used for calculation, data during calculation, and the like. In addition, the calculating part 1021 is sometimes realized as a program being executed by a processor, and in this case, the program is stored in the memory 10211.

The pedal rotation input part 1022 detects the pedal rotational speed from the input from the pedal rotation sensor 108 and outputs it to the calculating part 1021. The front wheel rotation input part 1023 calculates the rotation speed of the front wheel or the vehicle speed converted from the front wheel rotations (referred to as a front wheel speed), based on the input from the front wheel rotation sensor 109, and outputs the calculation result to the calculating part 1021. The motor speed input part 1024 receives the Hall signal from the motor 105, calculates the vehicle speed converted from the motor rotations (referred to a motor speed), and outputs the calculation result to the calculating part 1021. The torque input part 1027 digitizes a signal from the torque sensor 103 corresponding to a force applied to the pedal and outputs the signal to the calculating part 1021. The brake input part 1028 digitizes a signal from the brake sensor 104 corresponding to the brake force and outputs the signal to the calculating part 1021. The AD (analog-digital) input part 1029 digitizes an output voltage from the secondary battery 101 and outputs the resultant signal to the calculating part 1021. The memory 10211 may be provided separately from the calculating part 1021.

The calculating part 1021 outputs an advance angle value as the calculation result to the variable delay circuit 1025. The variable delay circuit 1025 adjusts the phase of the Hall signal based on the advance angle value received from the calculating part 1021, and outputs the resultant signal to the motor drive timing generator 1026. The calculating part 1021 outputs a PWM (pulse width modulation) code, which corresponds to the duty cycle of the PWM, for example, to the motor drive timing generator 1026 as a calculation result. The motor drive timing generator 1026 generates a switching signal for each FET included in the FET bridge 1030 based on the adjusted Hall signal provided from the variable delay circuit 1025 and the PWM code from the calculating part 1021, and outputs the switching signal.

Figure 9:
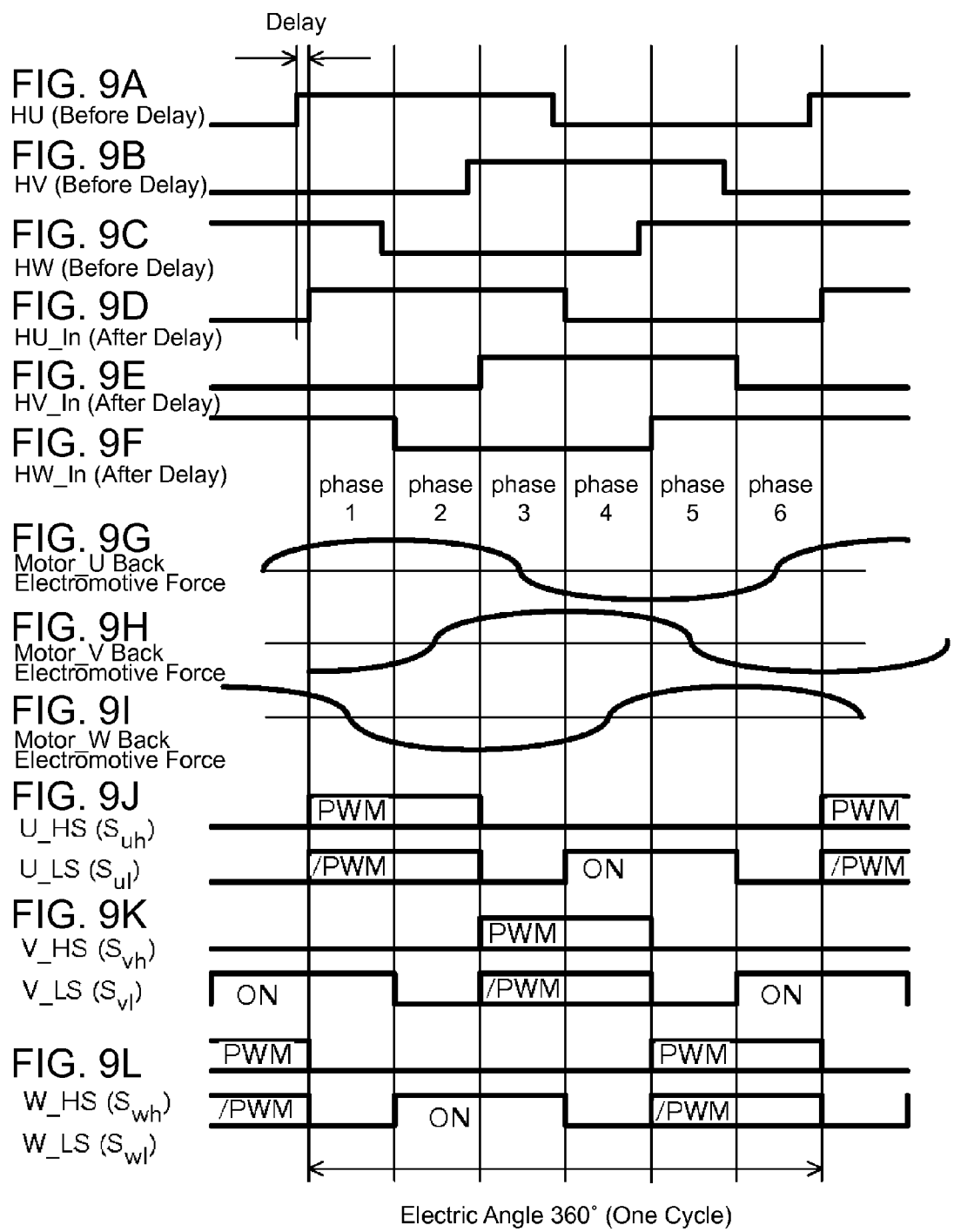
FIGS. 9A to 9L are waveform charts for describing basic operations for driving a motor.

FIGS. 9A to 9L illustrate basic operations of the motor drive based on the configuration shown in FIG. 8. FIG. 9A shows a U-phase Hall signal HU outputted from the motor 105, FIG. 9B shows a V-phase Hall signal HV outputted from the motor 105, and FIG. 9C shows a W-phase Hall signal HW outputted from the motor 105. As described, the Hall signals represent the rotational phases of the motor. Although the rotational phase is not obtained as a continuous value here, other sensors and the like may obtain a continuous value therefor. As described below, in the present embodiment, the Hall element of the motor 105 is provided such that the Hall signal is outputted at a somewhat advanced phase as shown in FIG. 9 and can be adjusted by the variable delay circuit 1025. Therefore, a U-phase Hall signal HU_In after adjustment as shown in FIG. 9D is outputted from the variable delay circuit 1025 to the motor drive timing generator 1026, a V-phase Hall signal HV_In after adjustment as shown in FIG. 9E is outputted from the variable delay circuit 1025 to the motor drive timing generator 1026, and a W-phase Hall signal HW_In after adjustment as shown in FIG. 9F is outputted from the variable delay circuit 1025 to the motor drive timing generator 1026.

One period of the Hall signal has 360° of electrical angle, which is divided into six phases.

Also, as shown in FIGS. 9G to 9I, back electromotive force voltages include a Motor_U back electromotive force that is generated in a U-phase terminal, a Motor_V back electromotive force that is generated in a V-phase terminal, and a Motor_W back electromotive force that is generated in a W-phase terminal. In order to drive the motor 105 by applying drive voltages at the same phases as the motor back electromotive force voltages, switching signals such as that shown in FIGS. 9J to 9L are outputted to respective gates of FETs of the FET bridge 1030. U_HS of FIG. 9J represents a U-phase high side FET ($S_{uh}$) gate signal, and U_LS represents a U-phase low side FET ($S_{ul}$) gate signal. PWM and "/PWM" represent an on/off period in the duty cycle corresponding to the PWM code, which is the calculation result of the calculating part 1021, and because the switching amplifier is of a complementary type, if PWM is on then /PWM is off, and if PWM is off, then /PWM is on. The low side FET ($S_{ul}$) is always on during the ON period. V_HS of FIG. 9K represents a V-phase high side FET ($S_{vh}$) gate signal, and V_LS represents a V-phase low side FET ($S_{vl}$) gate signal. The reference characters are the same as those of FIG. 9J. W_HS in FIG. 9L represents a W-phase high side FET ($S_{wh}$) gate signal, and W_LS represents a W-phase low side FET ($S_{wl}$) gate signal. The reference characters are the same as those of FIG. 9J.

In this way, the U-phase FETs ($S_{uh}$ and $S_{ul}$) conduct PWM switching at phases 1 and 2, and the U-phase low side FET ($S_{ul}$) is turned on in phases 4 and 5. The V-phase FETs ($S_{vh}$ and $S_{vl}$) conduct PWM switching at phases 3 and 4, and the V-phase low side FET ($S_{vl}$) is turned on in phases 6 and 1. The W-phase FETs ($S_{wh}$ and $S_{wl}$) conduct PWM switching in phases 5 and 6 and the W-phase low side FET ($S_{wl}$) is turned on in phases 2 and 3.

If such a signal is outputted and the duty cycle is appropriately controlled, the motor 105 can be driven with a desired torque or speed.

Figure 10:
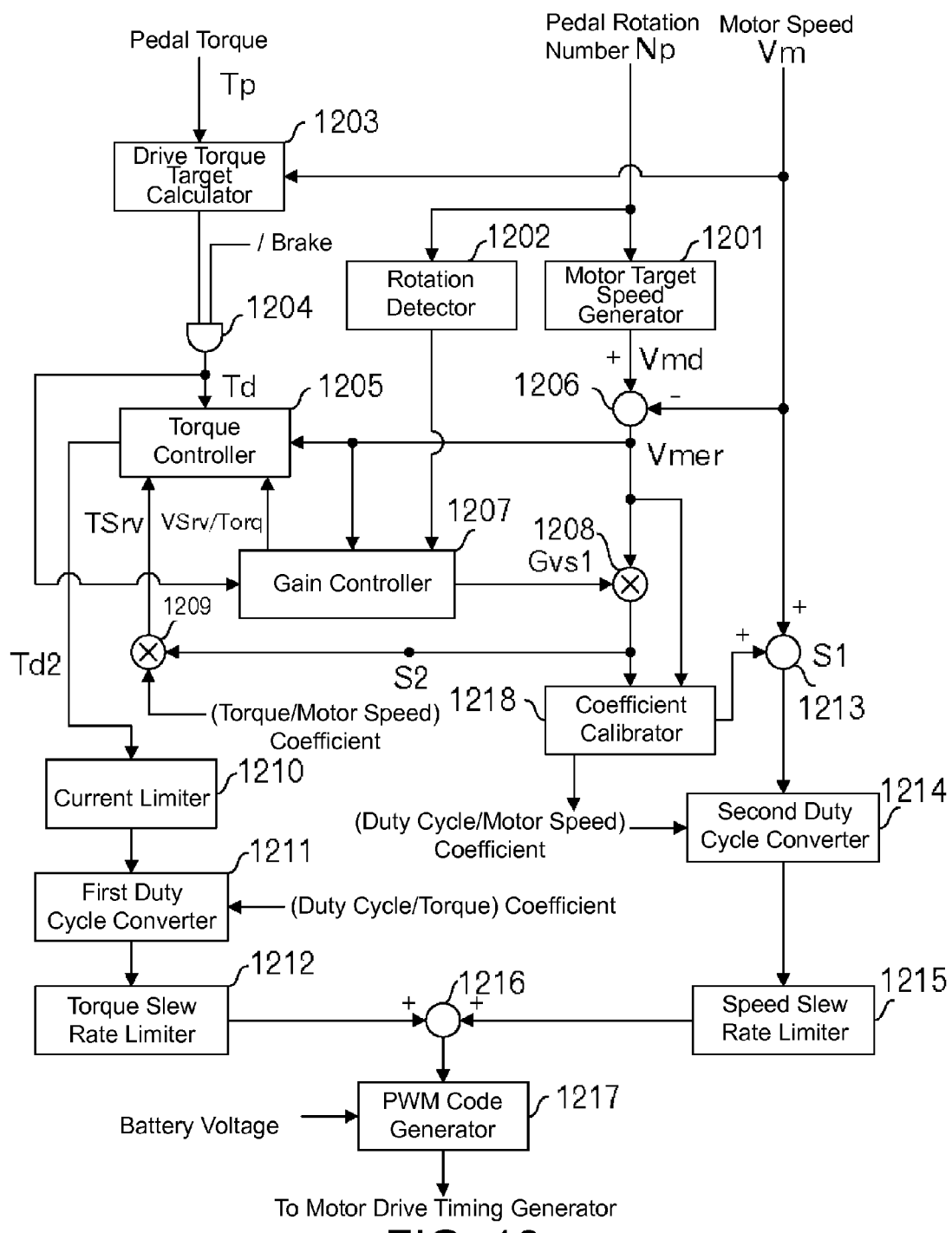
FIG. 10 is a block diagram of functions of a calculating part of Embodiment 1.

Next, a block diagram of the functions of the calculating part 1021 is shown in FIG. 10. The calculating part 1021 includes a motor target speed generator 1201, a rotation detector 1202, a drive torque target calculator 1203, a logical product calculator 1204, a torque controller 1205, an adder 1206, a gain controller 1207, a multiplier 1208, a multiplier 1209, a current limiter 1210, a first duty cycle converter 1211, a torque slew rate limiter 1212, an adder 1213, a second duty cycle converter 1214, a speed slew rate limiter 1215, an adder 1216, a PWM code generator 1217, and a coefficient auto-calibrator 1218.

Using a pedal torque Tp provided from the torque input part 1027 and a motor speed Vm provided from the motor speed input part 1024, the drive torque target calculator 1203 calculates and outputs an assist target torque Td.

Calculation performed by the drive torque target calculator 1203 is not the main point of the present embodiment, and the detailed description thereof is therefore omitted. However, for example, the drive torque target calculator 1203 calculates the assist target torque Td by smoothing the pedal torque with an LPF (low pass filter), extracting ripple components, and mixing the smoothened pedal torque and the ripple components at a prescribed mixture ratio. In some cases, other calculation processes may be performed in this calculation such as adjusting the mixture ratio in accordance with the motor speed and multiplying the smoothed pedal torque by the assist ratio that is limited in accordance with the motor speed. In this embodiment, smoothed torque is used as the target torque as described above, and therefore, it is not necessary to take into consideration the torque being zero at the top and bottom dead points every half rotation of a pedal.

The assist target torque Td outputted from the drive torque target calculator 1203 is outputted from the logical product calculator 1204 to the toque controller 1205 as is when a signal signifying "no brake" (/ brake) is sent from the brake input part 1028.

The number of pedal rotations Np sent from the pedal rotation input part 1022 is inputted to the rotation detector 1202, and the rotation detector 1202 determines whether the number of pedal rotations Np exceeds zero or a value that is regarded as zero, or not, and sends a pedal stop signal to the gain controller 1207 when the number of pedal rotations Np does not exceed zero or a value that is regarded as zero. The motor target speed generator 1201 calculates and outputs a motor target speed Vmd, based on the number of pedal rotations Np. The motor target speed generator 1201 will be described in detail below. The adder 1206 calculates a speed error Vmer by subtracting the motor speed Vm from the motor target speed Vmd outputted from the motor target speed generator 1201.

The gain controller 1207 determines and outputs an operation mode VSrv/Torq or Torq/VSrv and the first-order gain Gvs1 for the speed error Vmer, based on the speed error Vmer, the pedal stop signal from the rotation detector 1202, and the target torque Td. The gain controller 1207 will be described in detail below.

The multiplier 1208 derives and outputs the product of the speed error Vmer and the first-order gain Gvs1. The multiplier 1209 generates a servo torque value TSrv by multiplying the product of the speed error Vmer and the first-order gain Gvs1 by a predetermined "torque/motor speed" conversion coefficient, and outputs the servo torque value TSrv to the torque controller 1205.

The torque controller 1205 generates and outputs an adjusted target torque, that is, a drive target torque Td2 based on the assist target torque Td, the speed error Vmer, the servo torque value TSrv, and the operation mode VSrv/Torq. The torque controller 1205 will be described in detail below.

The current limiter 1210 performs current limiting such as (A) limiting a discharge current and an accumulated current of the secondary battery 101, and (B) limiting a current due to temperature in FET bridge 1030. However, because the torque feed-forward control is performed as the overall control, the drive target torque Td2 is limited not by performing a feedback control of the motor drive current, but by using the battery voltage, the PWM code (output from the PWM code generator 1217) of the preceding unit time period, and the temperature of the FET bridge 1030. With this process, in the torque feed-forward control, it is possible to output a target torque that meets current limiting requirements such as (1) limiting a discharge current and an accumulated current of the secondary battery 101, and (2) limiting a current through the temperature of the FET bridge 1030. This process is not the main point of the present embodiment and therefore will not be described any further.

The first duty cycle converter 1211 calculates a torque duty code by multiplying the output from the current limiter 1210 with a predetermined conversion coefficient (duty cycle/torque). This torque duty code is outputted to the adder 1216 through the torque slew rate limiter 1212.

The torque slew rate limiter 1212 conducts a well-known slew rate limiting process on the output from the first duty cycle converter 1211, and outputs the result of the slew rate limiting process to the adder 1216.

On the other hand, when the coefficient auto-calibrator 1218 is active, the output from the coefficient auto-calibrator 1218 (regular speed deviation) is added to the motor speed Vm at the adder 1213, and the result of the addition is outputted to the second duty cycle converter 1214. When the coefficient auto-calibrator 1218 is not active, 0 is added to the motor speed Vm at the adder 1213, and as a result, the motor speed Vm is outputted to the second duty cycle converter 1214.

The adder 1213 may be disposed at S2 in FIG. 10, instead of at S1. Further, the coefficient auto-calibrator 1218 and the adder 1213 are used when the auto-calibration process for the "duty cycle/motor speed" coefficient is performed while the vehicle is moving, and are therefore not provided in embodiments in which such a process is not performed when the vehicle is moving.

The second duty cycle converter 1214 calculates a motor speed duty code by multiplying the motor speed Vm by a conversion coefficient (duty cycle/motor speed). The motor speed duty code is outputted to the adder 1216 through the speed slew rate limiter 1215.

The speed slew rate limiter 1215 performs a well-known slew rate limiting process on the output from the second duty cycle converter 1214, and outputs the result of the process to the adder 1216.

The adder 1216 calculates a duty code by adding the torque duty code from the torque slew rate limiter 1212 to the motor duty code from the speed slew rate limiter 1215, and outputs the resultant duty code to the PWM code generator 1217. The PWM code generator 1217 generates a PWM code by multiplying the duty code by a battery voltage/reference voltage (24V, for example) from the AD input part 1029. The PWM code is outputted to the motor drive timing generator 1026.

As described above, the motor drive timing generator 1026 generates switching signals for the respective FETs in the FET bridge 1030 based on the adjusted Hall signal from the variable delay circuit 1025 and the PWM code from the PWM code generator 1217, and outputs these switching signals.

Here, the FETs in the FET bridge 1030, which is a switching amplifier, are switched such that the PWM code is made to be a duty cycle corresponding to the result of the addition at the adder 1216 (more specifically, the average duty cycle). Instead of using the switching scheme by PWM as described above, other methods such as PNM (pulse number modulation), PDM (pulse density modulation), and one-bit amplifier may be employed.

In this way, it is possible to drive the motor 105 with a voltage and a current that correspond to the duty cycle. By implementing such a torque feed-forward control, a stable control is made possible.

Figure 11:
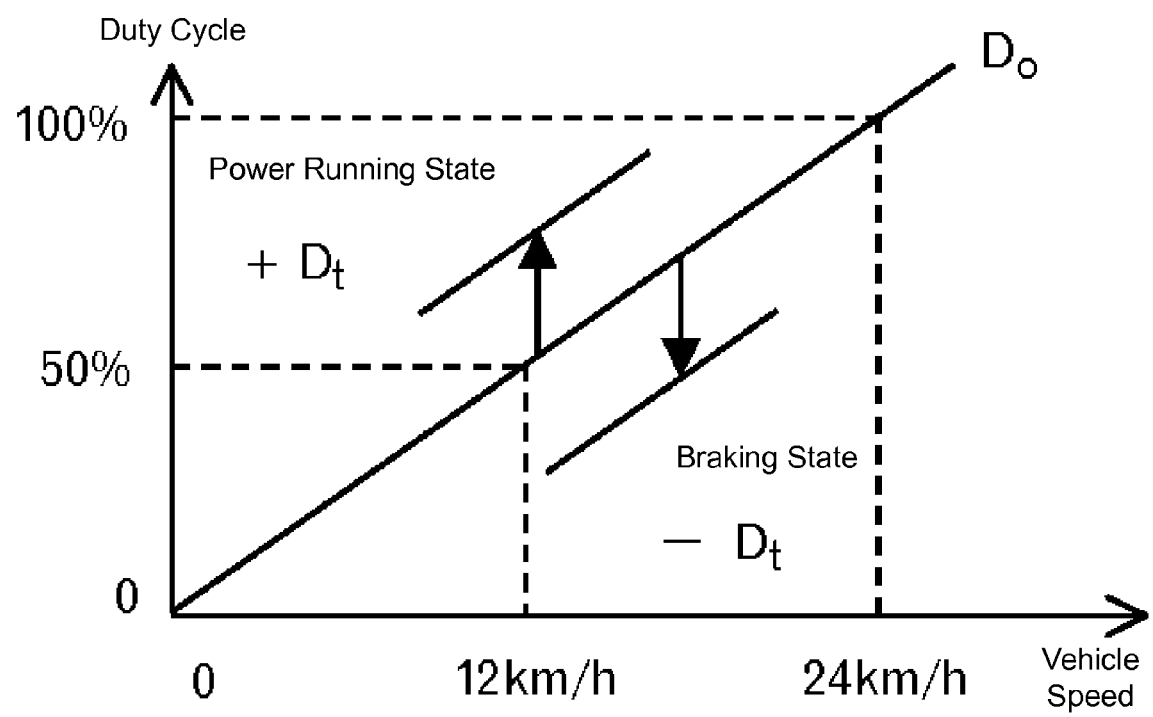
FIG. 11 is a diagram for explaining an operation of a motor drive control device.

The operation of such a motor drive controller 102 will be further explained with reference to FIG. 11. Here, the motor speed duty code is $D_0$, and the torque duty code is $D_t$, and as described above, the average duty cycle "Duty" is represented as follows:

$$Duty = D_0 + D_t$$

In this embodiment, if the current motor speed does not change, the average duty cycle "Duty" is changed so as to follow the line of $D_0$. When accelerating with the motor 105 being in a power running state, the target torque is set to a positive value, which is +Dt, for example, and therefore, the line is shifted upwardly for the value +Dt. In this case, the vehicle is accelerated for the target torque, but the average duty ratio is also relatively increased. On the other hand, when decelerating with the motor 105 being in a braking state, the target torque is set to a negative value, which is −Dt, for example, and therefore, the line is shifted downwardly for the value Dt. In this case, the vehicle is decelerated for the target torque, and the average duty ratio is also relatively decreased.

Further, in some cases, in order to address the positive rotation and reverse rotation of the motor 105, a positive value and a negative value are also set for the motor speed duty code $D_0$ that corresponds to the motor speed.

By implementing the torque feed-forward control as described above, a stable control can be achieved.

Figure 12:
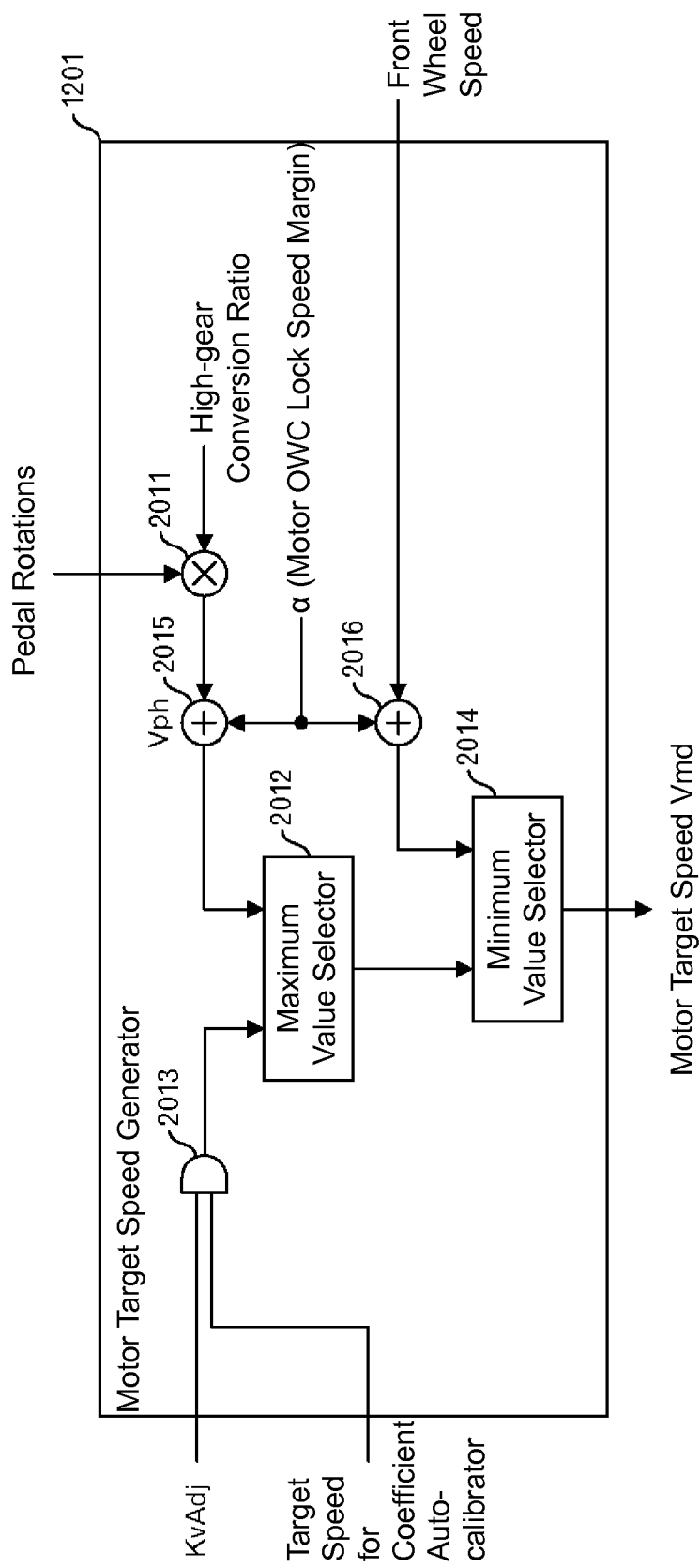
FIG. 12 is a block diagram of functions of a motor target speed generator.

FIG. 12 is a block diagram of functions of the motor target speed generator 1201. The motor target speed generator 1201 includes a multiplier 2011, a maximum value selector 2012, a minimum value selector 2014, a logical product calculator 2013, and adders 2015 and 2016.

The multiplier 2011 derives a pedal rotation conversion speed Vph, which is the speed converted from the pedal rotations, by calculating the product of the number of pedal rotations provided from the pedal rotation input part 1022 and a high-gear (that is, a gear for higher speed; in some cases, for the highest speed) conversion ratio, which is a coefficient to convert the number of pedal rotations to speed. The adder 2015 adds a motor OWC lock speed margin a to the pedal rotation conversion speed Vph. If an actual gear ratio can be obtained from the control panel 106 or the like, the actual gear ratio may be used instead of the high-gear conversion ratio. On the other hand, the logical product calculator 2013 outputs a target speed (8 km/h, for example) for coefficient auto-calibration if a signal KvAdj is on, which signifies the ON state of the mode for performing an auto-calibration process of the "duty cycle/motor speed" coefficient. If the signal KvAdj is off, the logical product calculator 2013 outputs 0.

The maximum value selector 2012 selects the greater of the output from the logical product calculator 2013 and the output from the multiplier 2011. That is, when the first target speed Vph calculated based on the number of pedal rotations is faster than the speed for coefficient auto-calibration, the maximum value selector 2012 outputs the first target speed Vph. On the other hand, when the first target speed Vph calculated based on the number of pedal rotations does not exceed the target speed for coefficient auto-calibration, that is, when the force on the pedal is small and the signal KvAdj, which signifies the ON state of the mode for performing the coefficient auto-calibration, is outputted from the calculating part 1021 and the like, the maximum value selector 2012 outputs the target speed for the coefficient auto-calibration.

The minimum value selector 2014 outputs, as a motor target speed Vmd, the smaller of the output of the maximum value selector 2012 and a value that was obtained by adding α at the adder 2016 to the front wheel speed outputted from the front wheel rotation input part 1023. That is, when the front wheel speed, which is the actual vehicle speed, does not exceed the first target speed Vph converted with the high-gear ratio due to a high pedal rotation speed, the front wheel speed is outputted as the motor target speed Vmd. On the other hand, when the output from the maximum value selector 2012 is smaller than the front wheel speed, which is the actual vehicle speed, the minimum value selector 2014 outputs the output result from the maximum value selector 2012 (the target speed for the coefficient auto-calibration is outputted when the first target speed Vph does not exceed the target speed for the coefficient auto-calibration and when the auto-calibration mode is ON, and the first target speed Vph converted with the high-gear ratio is outputted in other cases).

Figure 13:
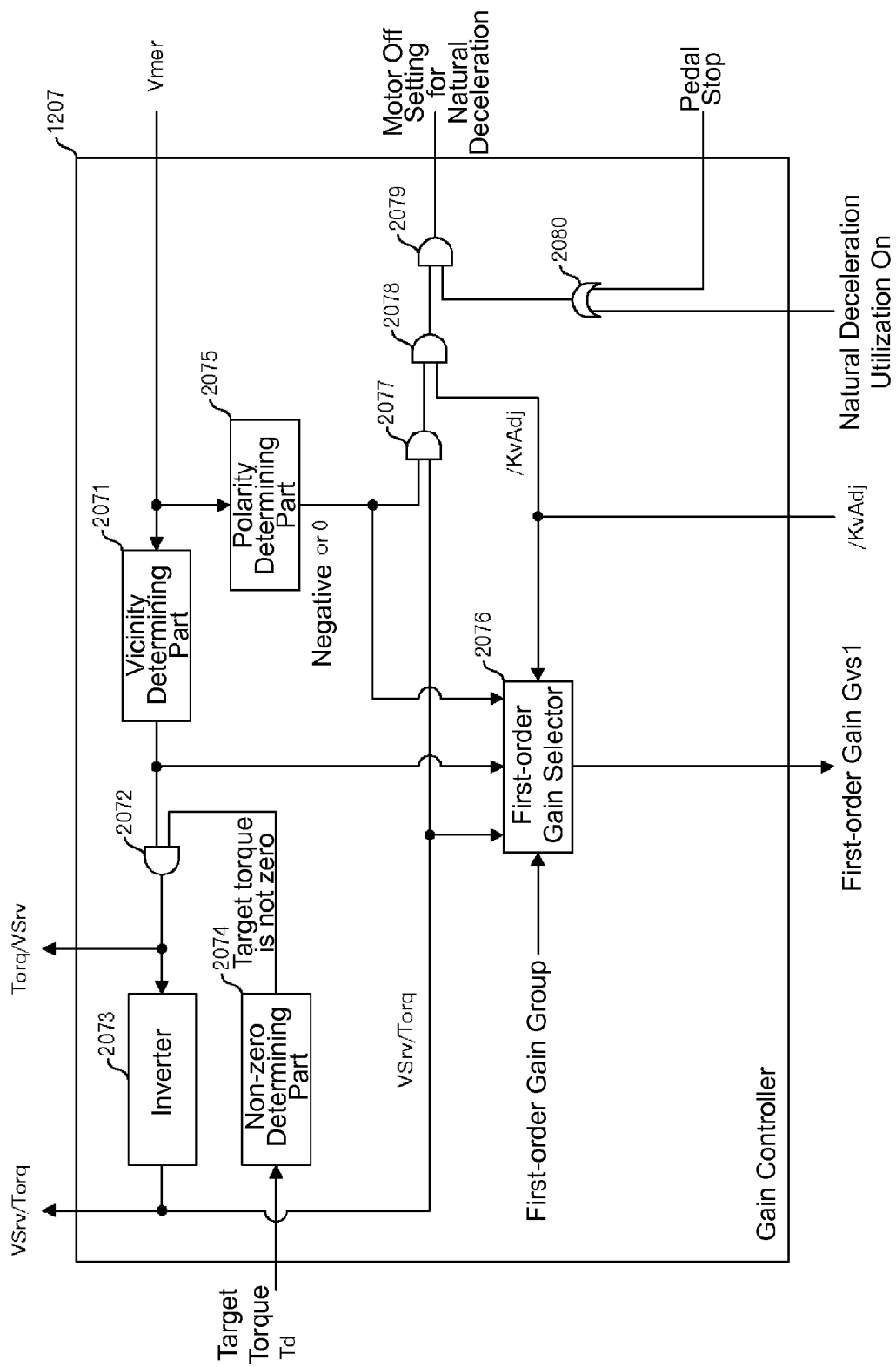
FIG. 13 is a block diagram of functions of a gain controller.

FIG. 13 is a block diagram of functions of the gain controller 1207. The gain controller 1207 includes a vicinity determining part 2071, a logical product calculator 2072, an inverter 2073, a non-zero determining part 2074, a polarity determining part 2075, a first-order gain selector 2076, a logical product calculator 2077, a logical product calculator 2078, a logical product calculator 2079, and a logical sum calculator 2080.

The vicinity determining part 2071 determines whether the absolute value of Vmer is 0 or within a prescribed range around 0, or not, and if the absolute value of Vmer is 0 or within the prescribed range around 0 (may also be simply referred to as "in the vicinity of zero"), the vicinity determining part 2071 outputs an ON signal. The non-zero determining part 2074 determines whether the assist target torque Td exceeds zero or a prescribed value regarded as zero, or not, and if the assist target torque Td exceeds zero or a prescribed value regarded as zero, the non-zero determining part 2074 outputs an ON signal that signifies the target torque not being zero. In this embodiment, one-way clutches are provided, and when the one-way clutch between the pedal and the rear wheel is not engaged (unlocked), the assist target torque Td is determined to be equal to or less than zero or a prescribed value regarded as zero due to the pedal being disengaged. When the one-way clutch between the motor 105 and the front wheel is disengaged (unlocked), free spinning of the motor occurs. When the front wheel is free-spinning on the ground, it is referred to as front wheel free-spinning, and when the rear wheel is free-spinning on the ground, it is referred to as rear wheel free-spinning.

The logical product calculator 2072 calculates a logical product of the output from the vicinity determining part 2071 and the output from the non-zero determining part 2074. When Vmer is 0 or within a prescribed range in the vicinity of 0, and when the target torque is not zero, the motor control mode becomes a torque control mode, and therefore, the logical product calculator 2072 turns on the signal Torq/VSrv. The inverter 2073 calculates a logical product for inverting the output from the logical product calculator 2072. That is, when Vmer is 0 or within a prescribed range in the vicinity thereof and when the target torque is not zero, which sets the control mode to the torque control mode, the signal VSrv/Torq is turned off. In contrast, when Vmer is not 0 nor within a prescribed range in the vicinity thereof, or when the target torque is zero, the motor control mode is a speed servo control mode (will be simply referred to as servo control mode below), and therefore, the signal Torq/VSrv is turned off, and the signal VSrv/Torq is turned on.

The polarity determining part 2075 determines whether Vmer is negative or 0, or not, and if Vmer is negative or 0, an ON signal is outputted. The logical product calculator 2077 calculates a logical product of the output from the polarity determining part 2075 and the signal VSrv/Torq. That is, the logical product calculator 2077 outputs an ON signal when Vmer is negative or 0 and when the control mode is the servo control mode. Further, the logical product calculator 2078 calculates a logical product of /KvAdj, which is a reverse signal of the signal KvAdj that signifies the on state of the coefficient auto-calibration mode, and the output from the logical product calculator 2077. That is, when the coefficient auto-calibration mode is off, when Vmer is negative or 0, and when the control mode is the servo control mode, the logical product calculator 2078 outputs an ON signal.

The logical sum calculator 2080 calculates a logical sum of the output from the rotation detector 1202 and the on settings of the natural deceleration utilization mode. That is, when the signal from the rotation detector 1202 that signifies no pedaling is on or when the natural deceleration utilization setting is on, the logical sum calculator 2080 outputs an ON signal. Then, the logical product calculator 2079 calculates a logical product of the output from the logical sum calculator 2080 and the output from the logical product calculator 2078. That is, when the coefficient auto-calibration mode is off; Vmer is negative or 0; the control mode is the servo control mode; and the pedals are stopped, or when the coefficient auto-calibration mode is off; Vmer is negative or 0; the control mode is the servo control mode; and the natural deceleration utilization setting is on, the logical product calculator 2079 outputs an ON signal to turn the motor 105 off so as to start natural deceleration. This makes it possible to prevent the motor 105 from being in a high-impedance state and performing unnecessary deceleration, which results in a reduction in energy loss upon re-acceleration. When the natural deceleration utilization setting is off and when the pedals are stopped, an ON signal to turn the motor 105 off is outputted for natural deceleration. When the pedals are not stopped, as described below, the deceleration is performed in accordance with the pedal rotations, and therefore, it is possible to perform forced deceleration so as to recoup the rotary energy in a highly efficient manner.

The first-order gain selector 2076 outputs, as the first-order gain Gvs1, one value selected from a predetermined first-order gain group, based on the output from the vicinity determining part 2071, VSrv/Torq, the output from the polarity determining part 2075, and /KvAdj.

In this embodiment, the first-order gain Gvs1 is outputted every time each state shown in FIG. 14 is achieved. The example of FIG. 14 shows respective states when the coefficient auto-calibration mode is off, that is, when /KvAdj is on. The running state numbers represent corresponding relationships with the diagram showing changes in running states, which will be later described.

The states are broadly categorized into the torque control mode and the speed servo control mode (also referred to as servo control mode). The servo control mode includes a state in which Vmer does not exceed 0 or a prescribed value regarded as 0 (in the vicinity of 0), and a state in which Vmer is not around zero (not in the vicinity of 0). Further, the state in which Vmer is not in the vicinity of 0 includes a state in which Vmer is greater than 0, which can be regarded as acceleration, and a state in which Vmer does not exceed 0, which can be regarded as deceleration.

In the torque control mode, the control is basically performed based on the target torque Td outputted from the drive torque target calculator 1203, and therefore, the first-order gain Gvs1 is set to 0. On the other hand, in the servo control mode, the first-order gain Gvs1 is set to a value that is sufficiently smaller than 1, but the value upon acceleration (Vmer=Vmd−Vm>0, Vmd>Vm) is set to be greater than the values of when Vmer is the vicinity of 0 and upon deceleration (Vmer=Vmd−Vm≤0, Vmd≤Vm). This makes it possible to change the assist target torque Td so as to follow the pedal rotation conversion speed.

Figure 15:
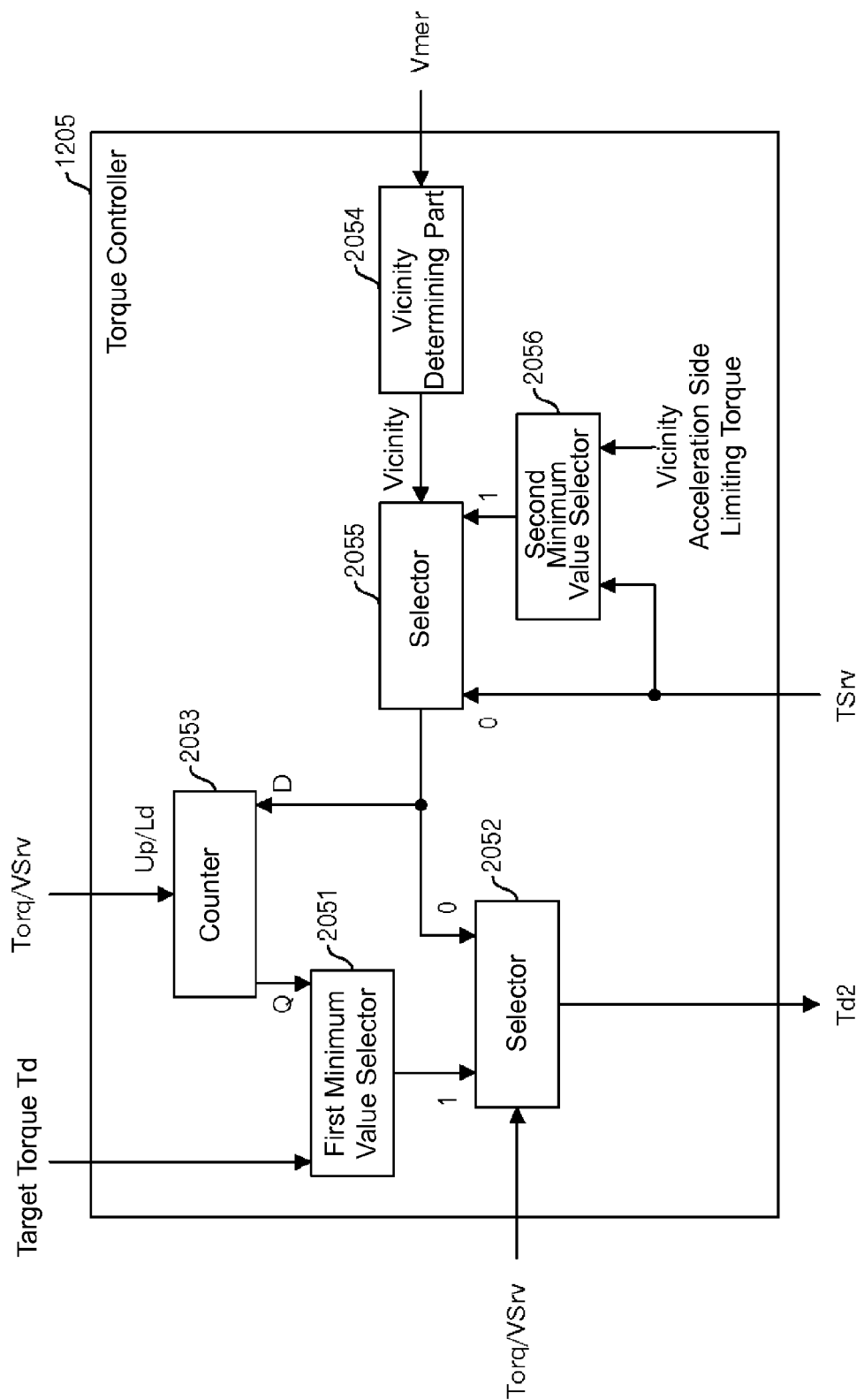
FIG. 15 is a block diagram of functions of a torque limiter.

FIG. 15 is a block diagram of functions of the torque controller 1205. The torque controller 1205 includes a first minimum value selector 2051, a selector 2052, a counter 2053, a vicinity determining part 2054, a selector 2055, and a second minimum value selector 2056.

The first minimum value selector 2051 outputs the smaller of the assist target torque Td outputted from the logical product calculator 1204 and the output from the counter 2053. The first minimum value selector 2051 outputs the value outputted from the counter 2053 until the output from the counter 2053 exceeds the assist target torque Td. When the output from the counter 2053 exceeds the assist target torque Td, the first minimum value selector 2051 starts outputting the assist target torque Td.

In the torque control mode, that is, when Torq/VSrv is on ("1"), the selector 2052 outputs, as a drive target torque Td2, the output from the first minimum value selector 2051. On the other hand, in the servo control mode, that is, when Torq/VSrv is off ("0"), the selector 2052 outputs, as the drive target torque Td2, an output from the selector 2055. That is, in the torque control mode, the assist target torque Td is outputted almost always. On the other hand, in the servo control mode, the selector 2052 outputs TSrv that is obtained by converting Vmer×Gvs1 to torque and the like.

The vicinity determining part 2054 determines whether the absolute value of Vmer is 0 or not greater than a prescribed value regarded as 0, or not. The vicinity determining part 2054 outputs ON ("1") when Vmer is 0 or not greater than a prescribed value regarded as 0, and outputs OFF in other cases. When the output from the vicinity determining part 2054 is ON ("1"), the selector 2055 outputs an output from the second minimum value selector 2056 to the selector 2052 and the counter 2053. On the other hand, when the output from the vicinity determining part 2054 is OFF ("0"), the selector 2055 outputs TSrv to the counter 2053 and the selector 2052.

The second minimum value selector 2056 outputs to the selector 2055 the smaller of a prescribed vicinity acceleration side limiting torque and TSrv.

In the torque control mode, that is, when the Torq/VSrv signal is ON, the counter 2053 counts up to the maximum value, and outputs it. On the other hand, in the servo control mode, that is, when the Torq/VSrv signal is OFF, the output from the selector 2055 is continuously loaded to the counter 2053.

As described, in the servo control mode, when the absolute value of Vmer is 0 or not greater than a prescribed value regarded as 0, the value of the second minimum value selector 2056 is outputted as the drive target torque Td2, and when the absolute value of Vmer is greater than 0 or a prescribed value regarded as 0, TSrv is outputted as the drive target torque Td2. In this way, when Vmer is 0 or not greater than a prescribed value regarded as 0, a torque that exceeds the vicinity acceleration side limiting torque is not outputted as the drive target torque Td2. This makes it possible to prevent a shock and noise resulting from the motor 105 hitting the one-way clutch hard, when the motor 105 engages in the one-way clutch in transitioning to the torque control mode.

On the other hand, when the absolute value of Vmer is greater than 0 or a prescribed value regarded as 0, TSrv is outputted as the drive target torque Td2. That is, in the servo control mode, the drive target torque Td2 is outputted in accordance with TSrv that is obtained by converting Vmer× Gvs1 to torque. This means that the control is performed in accordance with the number of pedal rotations or the pedal rotational speed. More specifically, a tracking control in accordance with Vmer is performed.

When the servo control mode is switched to the torque control mode, the counter 2053 starts counting up from the value outputted by the selector 2055 immediately therebefore, and until the value exceeds the assist target torque Td, the output from the counter 2053 is outputted as the drive target torque Td2. After the output of the counter 2053 reaches the assist target torque Td, the assist target torque Td is outputted as Td2. This way, it is possible to prevent a sudden change in the drive target torque Td2 when the mode is switched.

Figure 16:
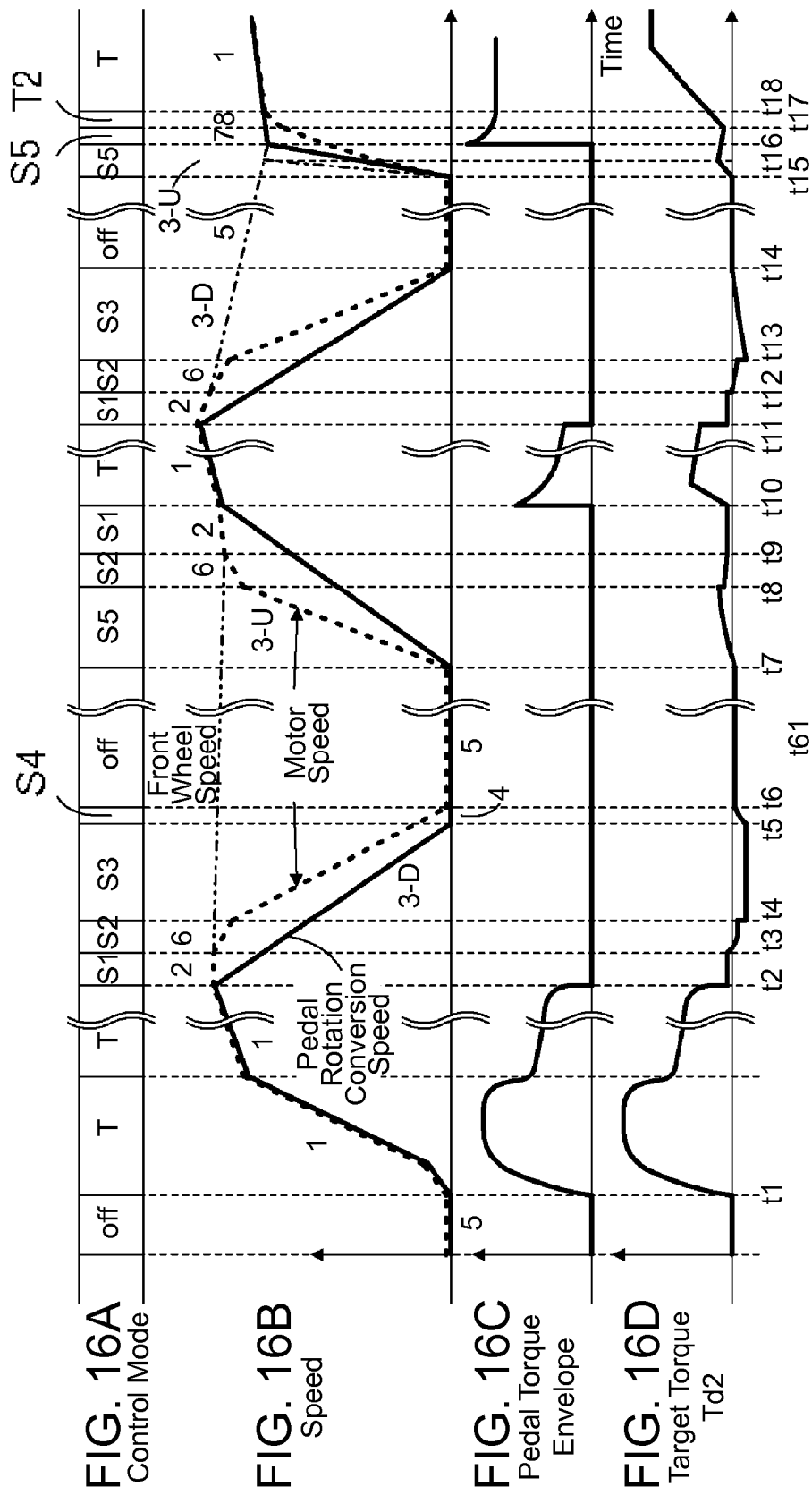
FIGS. 16A to 16D show one example of changes in running states.

By performing the control in the manner described above, the running states can be changed as shown in FIGS. 16A to 16D. In FIG. 16A represents a temporal change in the control mode; FIG. 16B represents a temporal change in the pedal rotation conversion speed (solid line), a temporal change in the motor speed Vm (dotted line), and a temporal change in the front wheel speed (two-dot chain line); FIG. 16C represents a temporal change in the envelope of the pedal torque; and FIG. 16D represents a temporal change in the assist target torque Td.

In this example, between time t1 and time t2, a rider increases the front wheel speed by pedaling, and at the time t2, the number of pedal rotations and pedal rotation conversion speed start decreasing, and the one-way clutch in the pedal drive system is disengaged. That is, the target torque becomes 0. Thereafter, the number of pedal rotations and pedal rotation conversion speed continue to decrease until time t5, and at the time t5, the number of pedal rotations and pedal rotation conversion speed reach 0. This state continues until time t7. Between time t2 and time t10, the front wheel speed gradually decreases.

At the time t7, the rider starts pedaling, but until the time t10, the one-way clutch in the pedal drive system remains disengaged. At the time t10, the one-way clutch in the pedal drive system is engaged, and the assist target torque Td starts being inputted. At time t11, the number of pedal rotations and pedal rotation conversion speed start decreasing again, and the one-way clutch in the pedal drive system is disengaged. That is, the assist target torque Td becomes 0. Between the times t11 and t14, the number of pedal rotations and pedal rotation conversion speed gradually decrease, and at the time t14, the number of pedal rotations and pedal rotation conversion speed reach 0. This state continues until time t15. Between the times t11 and t16, the front wheel speed gradually decreases.

At time t15, the rider suddenly starts pedaling fast, and therefore, at time t16, the pedal rotation conversion speed reaches the front wheel speed. As a result, at the time t16, the one-way clutch in the pedal drive system is engaged, and the assist target torque Td starts being inputted.

Between the time t1 and the time t2, the pedal rotation conversion speed, the motor speed, and the front wheel speed substantially coincide with each other. Between the time t2 and the time t3, the motor speed and the front wheel speed substantially coincide with each other. Between the time t9 and the time t10, the motor speed and the front wheel speed substantially coincide with each other, and between the time t10 and the time t11, the pedal rotation conversion speed, the motor speed, and the front wheel speed substantially coincide with each other. Between the time t16 and the time t18, the pedal rotation conversion speed and the front wheel speed substantially coincide with each other, and after the time t18, the pedal rotation conversion speed, the motor speed, and the front wheel speed substantially coincide with each other.

Prior to the time t1, the motor 105 is off and in the high-impedance state, and therefore, the control mode is "off." That is, because the pedal rotation does not exceed 0 or a prescribed value regarded as 0 (including reverse rotations), and the motor rotation does not exceed 0 or a prescribed value regarded as 0, the running state is the servo control mode (that is, the running state (5)). However, because the assist target torque Td is 0 (that is, because the pedals are stopped), the motor 105 is turned off by the gain controller (FIG. 13).

Between the times t1 and t2, the target torque is not zero, as described above, and the motor speed increases so as to follow the front wheel speed. As a result, the absolute value of Vmer becomes 0 or does not exceed a prescribed value regarded as 0, and the control mode is set to the torque control mode (T in the figure). Torq/VSrv is turned on. That is, in this running state (referred to as a running state (1)), the target torque is not zero, or the motor 105 is not disengaged, and therefore, the drive target torque Td2 that corresponds to the assist target torque Td is outputted. That is, between the times t1 and t2, the waveform of the pedal torque envelope (FIG. 16C) is similar to that of the assist target torque Td (FIG. 16D).

At the time t2, the assist target torque Td becomes 0, and pedals are disengaged. However, the pedals are rotating, and the one-way clutch in the motor drive system is engaged (that is, the motor speed exceeds the front wheel speed). In this running state (referred to as a running state (2)), VSrv/Torq is on, and the servo control mode S1 is started. As shown in FIG. 14, a smaller value is used as the first-order gain Gvs1. In this running state, at the torque controller 1205, the vicinity determining part 2054 determines the vicinity, and the selector 2055 selects the output from the second minimum value selector 2056. However, because the second minimum value selector 2056 selects the vicinity acceleration side limiting torque, this vicinity acceleration side limiting torque is outputted as the drive target torque Td2.

At the time t3, not only the pedals, but also the motor is disengaged. However, the time t3 is not clearly defined. In this running state (referred to as the running state (6)), VSrv/Torq is on, and the servo control mode S2 is started. As shown in FIG. 14, a smaller value is used as the first-order gain Gvs1. In this running state, at the torque controller 1205, the vicinity determining part 2054 detects the vicinity, and the selector 2055 selects the output from the second minimum value selector 2056. However, because the second minimum value selector 2056 selects TSrv, based on Vmer, which turned into a negative value, TSrv is outputted as the drive target torque Td2.

At the time t4, the vicinity determining part 2054 and the like start detecting non-vicinity. In this running state (referred to as a running state (3-D)), VSrv/Torq is on, and the servo control mode S3 is started. As shown in FIG. 14, a smaller value is used as the first gain Gvs1. As a result, the selector 2055 selects TSrv, based on Vmer, which was turned into a negative value, and TSrv is outputted as the drive target torque Td2.

Further, at the time t5, the assist target torque Td is zero, and the number of pedal rotations does not exceed 0 or a prescribed value regarded as 0, but the motor speed exceeds 0 or a prescribed value regarded as 0. In this running state (referred to as a running state (4)), unlike the running state (3), the rotation detector 1202 determines that the pedals are stopped. This causes the servo control mode S4 to start.

As described above, between the time t2 and the time t6, the control mode is the servo control mode, and as shown in FIG. 16B, the motor speed is controlled so as to follow the pedal rotation conversion speed. Between the time t3 and the time t6, the logical product calculator 2078 in the gain controller 1207 outputs ON, and therefore, the motor 105 is turned off when the natural deceleration utilization setting is on or no rotation of the pedals is detected.

Thereafter, at the time t6, the motor speed is equal to or smaller than 0 or a prescribed value regarded as 0, and the same state as that prior to the time t1 is obtained, thereby returning to the running state (5). The control mode is still the servo control mode.

At the time t7, the pedals start rotating, but because the front wheel speed is still high, the pedals are disengaged, and the motor is also disengaged. Also, the vicinity determining part 2054 and the like detect non-vicinity, and TSrv that corresponds to Vmer, which is a positive value (=Vmd−Vm), is outputted as the drive target torque Td2. Therefore, according to FIG. 14, the first-order gain Gvs1 is set to a greater value as compared to when the vicinity is detected or when Vmer is 0 or a negative value. In this running state (referred to as a running state (3-U)), the servo control mode S5 is started.

Thereafter, at the time t8, the vicinity determining part 2054 and the like detect vicinity, and the selector 2054 selects the output from the second minimum value selector 2056. However, according to FIG. 14, when the vicinity is detected, the first gain Gvs1 is set to a smaller value, and therefore, the second minimum value selector 2056 selects TSrv, and TSrv is outputted as the drive target torque Td2. Because this is the same as the period between the time t3 and t4, the running state returns to the running state (6), and the control mode returns to the servo control mode S2. This way, the rate of increase in motor speed can be made small, which makes it possible to mitigate a shock in the one-way clutch that would be caused by the motor 105.

Around the time t9, the motor rotational speed reaches the front wheel speed, and the motor 105 engages to the one-way clutch. Also, the motor speed coincides with the front wheel speed, and the target speed is the front wheel speed+α (motor OWC lock margin speed), as TSrv and Td2, a torque that is obtained by multiplying α with the vicinity gain is outputted. Because this is the same as the period between the time t2 and t3, the running state returns to the running state (2), and the control mode returns to the servo control mode S1.

Thereafter, when the number of pedal rotations increases, at the time t10, the pedals are engaged to the one-way clutch in the pedal drive system. As a result, the target torque is not zero, and the motor speed substantially coincides with the front wheel speed, which causes the vicinity determining part 2054 and the like to detect the vicinity. Therefore, the control mode is changed to the torque control mode T, and the running state (1) is started. However, immediately after the transition to the torque control mode T, the counter 2053 makes adjustment such that the output value is gradually changed from TSrv in the servo control mode to the assist target torque Td.

Between the times t11 and t15, the same operation as the period between the time t2 and t7 is performed except that the running state (4) does not exist.

At the time t15, the driver starts pedaling again. This time is different from the period between the time t7 and t8 in that the number of pedal rotations is drastically increased. The speed converted by the fastest gear ratio is represented by the one-dot chain line for reference. In some cases, Vmer is calculated by using this value as Vmd. The running state during this period is the same as that of the period between the times t7 and t8, which are the running state (3-U) and the servo control mode S5. However, the change in pedal rotation conversion speed is too great for the motor speed to keep up with.

At the time t16, the pedal is engaged to the one-way clutch in the pedal drive system, but the motor 15 is still disengaged. Therefore, while the control mode stays the same, which is the servo control mode S5, the running state becomes the running state (7) because the motor is still not engaged even through the target torque is not zero.

Thereafter, the motor speed increases, and at the time t17, the vicinity determining part 2054 and the like detect the vicinity, and as a result, because the target torque is not zero, the control mode is changed to the torque control mode T2. Because the torque control mode is started, the counter 2053 starts functioning. That is, the drive target torque Td2 is gradually increased from the value of TSrv of the preceding period until reaching the assist target torque Td.

Around the time t18, the motor 105 is engaged to the one-way clutch in the motor drive system, and the running state (1) and the torque control mode T are achieved.

By performing the above-mentioned control, it is possible to conduct an appropriate motor drive control in accordance with the pedal operation of the driver.

Figure 17:
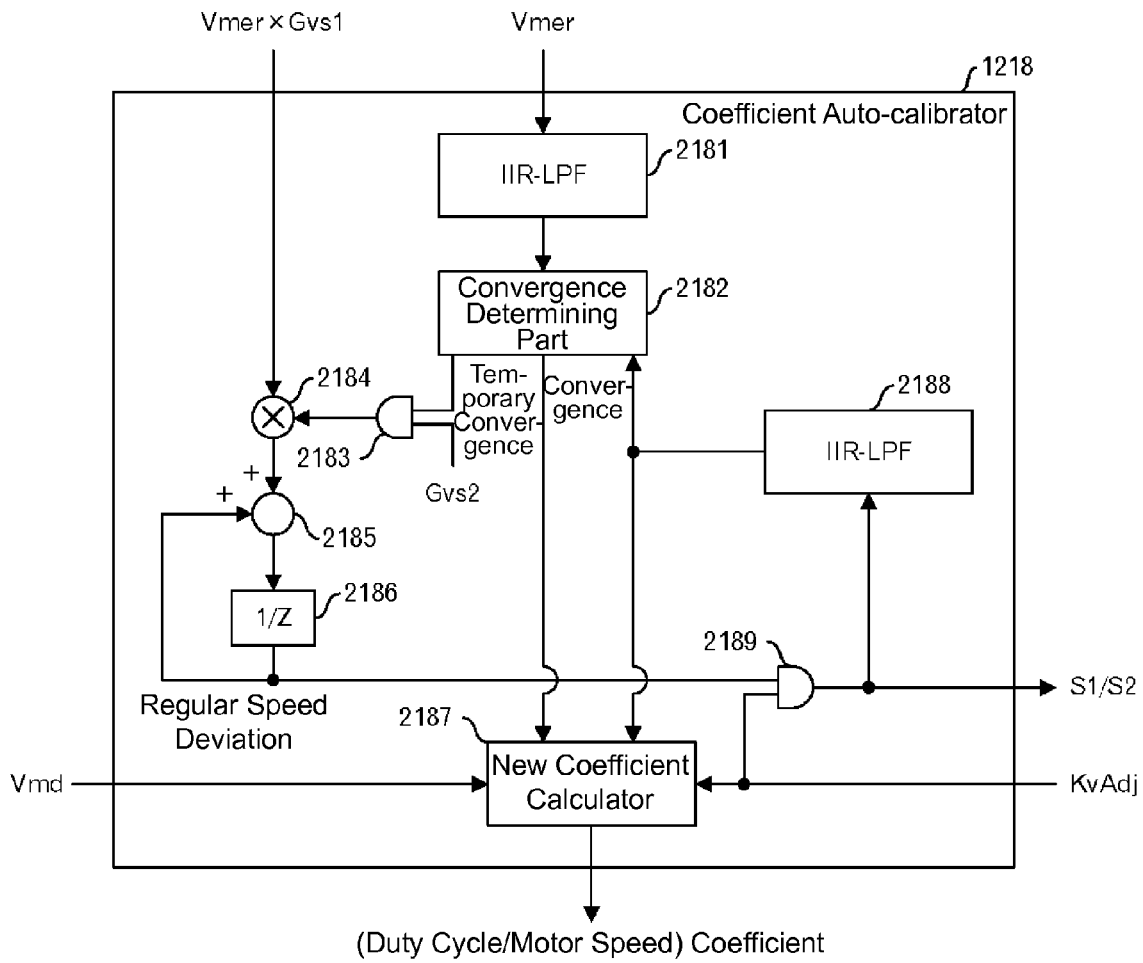
FIG. 17 is a block diagram of functions of a coefficient auto-calibrator.
Figure 19:
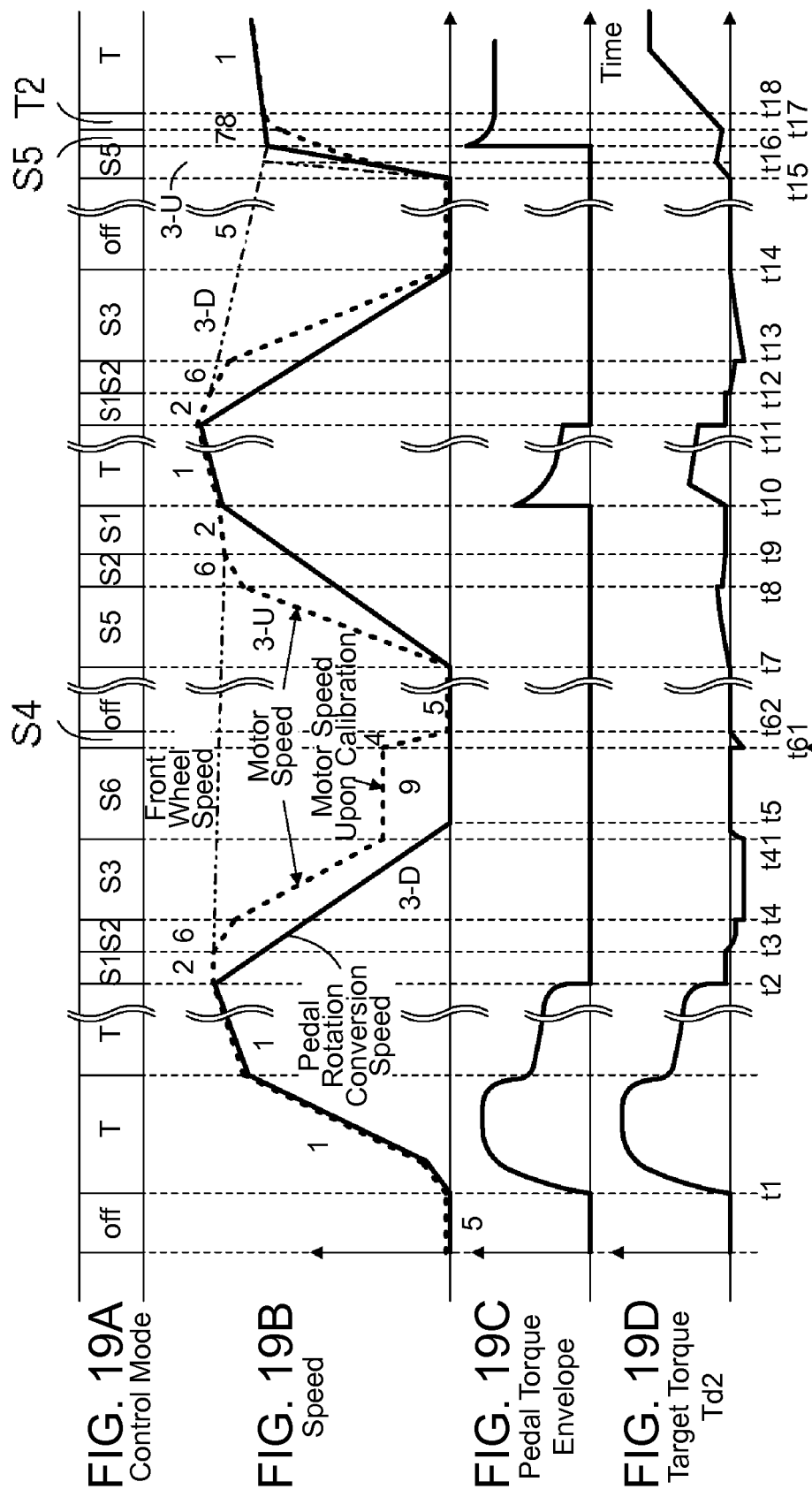
FIGS. 19A to 19D show changes in running states in a case where the coefficient auto-calibration process is performed.

Next, configuration and operation of the coefficient auto-calibrator 1218 will be explained. FIG. 17 is a block diagram of functions of the coefficient auto-calibrator 1218. The coefficient auto-calibrator 1218 includes IIR (infinite impulse response)-LPF (low pass filter) 2181, a convergence determining part 2182, a logical product calculator 2183, a multiplier 2184, an adder 2185, a delayer 2186, a logical product calculator 2189, IIR-LPF 2188, and a new coefficient calculator 2187.

For example, after the motor drive controller 102 is turned on, when the vehicle speed and the pedal speed satisfy prescribed conditions, the signal KvAdj stays on until the coefficient auto-calibration process is completed, or the prescribed conditions are no longer satisfied. The signal KvAdj may also be turned ON when the motor temperature has largely changed.

When the signal KvAdj is not on, the new coefficient calculator 2187 is not active, and the output from the logical product calculator 2189 is 0, therefore, no effect is caused.

IIR-LPF 2181 is an LPF for Vmer. IIR-LPF 2181 is turned on when the signal KvAdj is turned on, and Vmer is loaded thereto as an initial value.

On the other hand, IIR-LPF 2188 is an LPF for regular speed deviation that is an output from an integral loop that includes the delayer 2186 and the adder 2185.

The convergence determining part 2182 performs a convergence test based on the time or the output from the IIR-LPF 2181 and the output from the IIR-LPF 2188. The convergence test has two steps. In the first test, a temporary convergence is detected based on the time (about 0.5 seconds, for example), and the output of the temporary convergence is changed from off to on. That is, until the temporary convergence is detected, the logical product calculator 2183 outputs 0, and when the temporary convergence is detected, the logical product calculator 2183 outputs the second-order gain Gvs2. The multiplier 2184 multiplies Vmer×Gvs1 with zero, and outputs the resultant value until the temporary convergence is detected. The regular speed deviation is also set to 0 in the beginning.

On the other hand, after the temporary convergence is detected, the multiplier 2184 multiplies Vmer×Gvs1 with Gvs2, and outputs the resultant value. Also, upon the temporary convergence, the regular deviation initial value is loaded to the IIR-LPF 2188, and the operation is started. The regular deviation initial value is set to "Vmer upon the temporary convergence"×"first-order gain Gvs1 before the temporary convergence+1."

The output from the logical product calculator 2189 is added to the motor speed Vm at the adder 1213 in S1 (or S2) in FIG. 10. That is, a PI control system is constructed.

FIG. 18 shows examples of setting the first-order gain Gvs1 and the second-order gain Gvs2. As shown in FIG. 18, before the temporary convergence (also referred to as an initial stage), the first-order gain Gvs1 is 1, and the second-order gain Gvs2 is 0. After the temporary convergence, the first-order gain Gvs1 is ¼, and the second-order gain Gvs2 is ¹⁄₁₆. These values are exemplary, and may be other values.

First, as shown in FIG. 12, the logical product calculator 2013 in the motor target speed generator 1201 outputs the target speed for the coefficient auto-calibration (8 km/h, for example) to the maximum value selector 2012 when the signal KvAdj is turned on. Therefore, when the output Vph from the multiplier 2011 is smaller than the target speed for the coefficient auto-calibration, the target speed for the coefficient auto-calibration is selected at the maximum value selector 2012. Then, at the minimum value selector 2014, if the front wheel speed is greater than the target speed for the coefficient auto-calibration, the target speed for the coefficient auto-calibration is outputted as the motor target speed Vmd. While the signal KvAdj is on, the gain controller 1207 does not turn the motor 105 off even when the vehicle is decelerating and when the control mode is the servo control mode. That is, the motor target speed is maintained at the target speed for the coefficient auto-calibration. KvAdj is turned on after confirming the front wheel speed is equal to or more than a prescribed value (10 km/h, for example) and the pedal rotation conversion speed is equal to or less than a second prescribed value (5 km/h, for example). When these conditions become no longer met during the coefficient auto-calibration process, KvAdj is turned off, the coefficient auto-calibration process is cancelled, and the control process returns to the normal servo control mode or torque control mode. Also, when the coefficient auto-calibration process is completed, the control mode returns to the normal servo control mode.

When the above-mentioned conditions are met, for example, as shown in FIGS. 19A to 19D, between time t41 to time t61 when the coefficient auto-calibration is completed, the motor target speed is maintained at the target speed for the coefficient auto-calibration, and the motor speed is maintained in accordance therewith. At the time t61 when the coefficient auto-calibration is completed, the normal servo control mode S4 is started, and the motor is stopped at t62. Because the coefficient auto-calibration mode is also the servo control mode, small servo torque to maintain the motor speed during the calibration in a disengaging state is outputted as the drive target torque Td2.

In the beginning of the coefficient auto-calibration process, as described above, Vmer is loaded to the IIR-LPF 2181. Also, the values of the first-order gain Gvs1 and the second-order gain Gvs2 are set in the manner shown in FIG. 18. The initial value of the regular speed deviation is set to 0.

Thereafter, when a prescribed period of time (0.5 seconds, for example) has passed, for example, the convergence determining part 2182 determines that the temporary convergence occurred, and turns the temporary convergence signal on. As a result, the second-order gain Gvs2 is outputted to the multiplier 2184. Also, the values of the first-order gain Gvs1 and the second-order gain Gvs2 are set in the manner shown in FIG. 18. The initial value of the regular speed deviation is set to Vmer×(first-order gain Gvs1 at the preceding point+1), and this initial value of the regular speed deviation is loaded to the IIR-LPF 2188 as an initial value.

The convergence determining part 2182 determines that convergence occurred when the difference between the output from the IIR-LPF 2181 and the output from the IIR-LPF 2188 falls under a prescribed percentage (0.3%, for example) of the output from the IIR-LPF 2181 after one second has passed since the temporary convergence, or when a prescribed period of time (5 seconds, for example) has passed after the temporary convergence.

When the convergence signal from the convergence determining part 2182 is turned on, the new coefficient calculator 2187 set the current "duty cycle/motor speed" coefficient× (motor target speed Vmd+output from IIR-LPF 2188)/motor target speed Vmd as a new "duty cycle/motor speed" coefficient.

This way, the "duty cycle/motor speed" coefficient can be appropriately auto-calibrated.

Alternatively, the new "duty cycle/motor speed" coefficient may be calculated in a simpler manner. In this case, the temporary convergence is omitted, and the new "duty cycle/motor speed" coefficient is calculated at the new coefficient calculator 2187 with the above-mentioned formula after setting the first-order gain Gvs1 and the second-order gain Gvs2 as shown in FIG. 18 and performing the above-mentioned conversion test. The IIR-LPF 2181 and IIR-LPF 2188 are merely used as averaging filters to ensure S/N and improve accuracy, and therefore, an FIR (finite impulse response)-LPF may also be used, and it is also possible to omit these filters when a sufficient S/N ratio is ensured for obtaining a new coefficient.

Embodiment 2

Figure 20:
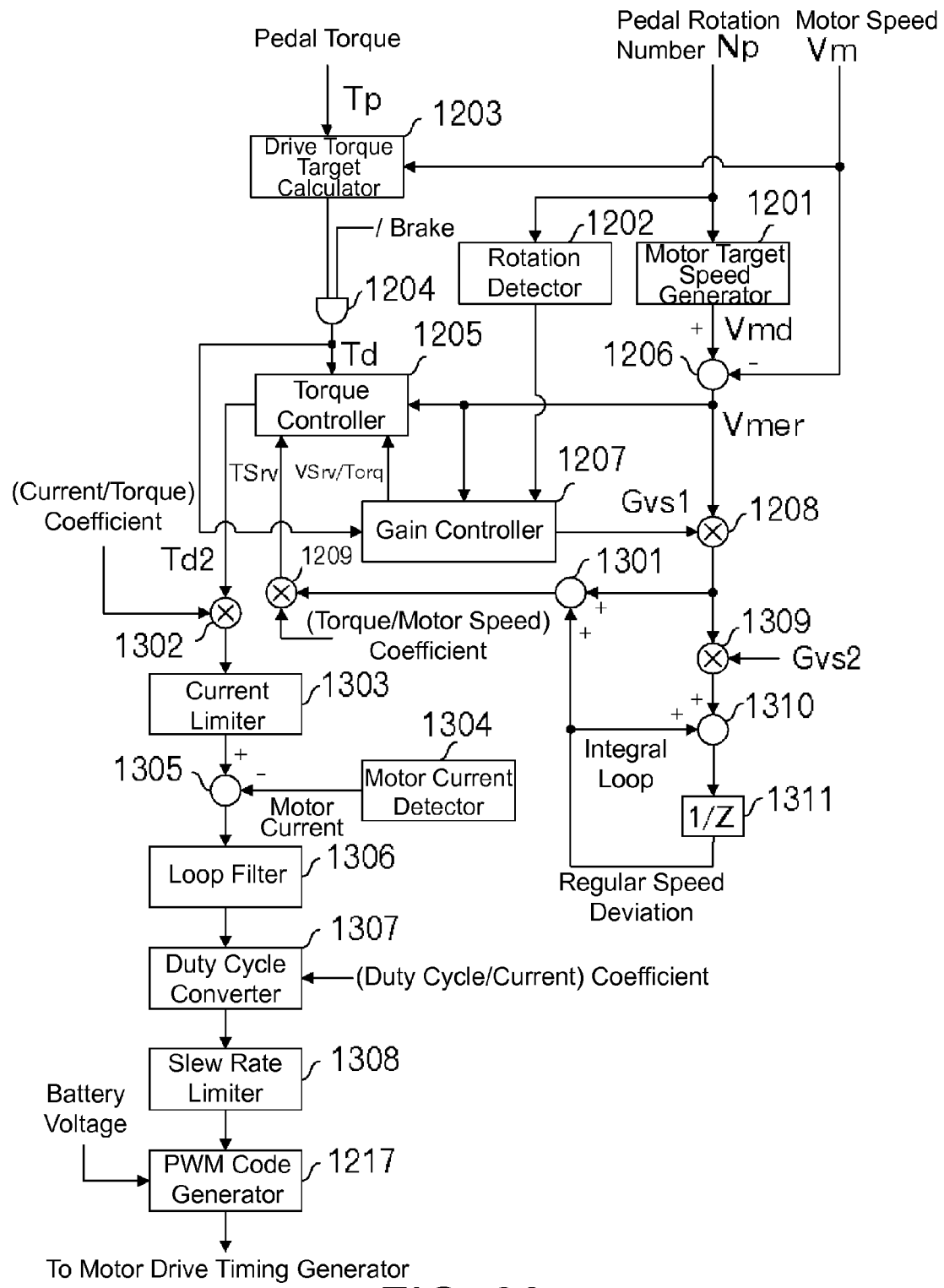
FIG. 20 is a block diagram of functions of a calculating part of Embodiment 2.

In Embodiment 1, the configuration example for performing the torque feed-forward control was described. FIG. 20 shows a configuration of a calculating part 1021b when another control scheme such as a current feed-back control is employed. Constituting elements having functions similar to those in Embodiment 1 are given the same reference characters.

In the example of FIG. 20, the calculating part 1021b includes a motor target speed generator 1201, a rotation detector 1202, a drive torque target calculator 1203, a logical product calculator 1204, a torque controller 1205, an adder 1206, a gain controller 1207, a multiplier 1208, a multiplier 1209, an adder 1301, a multiplier 1302, a current limiter 1303, a motor current detector 1304, an adder 1305, a loop filter 1306, a duty cycle convertor 1307, a slew rate limiter 1308, a PWM code generator 1217, a multiplier 1309, an adder 1310, and a delayer 1311.

In this embodiment, the coefficient auto-calibrator 1218 is not provided, and therefore, KvAdj signal is off, and /KvAdj signal is on.

In this embodiment, based on the value obtained by multiplying the motor speed error Vmer×Gvs1 by the second-order gain Gvs2, the regular speed deviation is calculated at the integral loop that includes the adder 1310 and the delayer 1311. This regular speed deviation is added to the motor speed error Vmer×Gvs1 at the adder 1301.

The drive target torque Td2, which is the output from the torque controller 1205, is multiplied by the "current/torque" coefficient at the multiplier 1302, and is converted into a current. That is, the target current is derived. At the current limiter 1303, the target current undergoes current limiting by other elements.

On the other hand, the motor current detector 1304 detects and outputs a current that flows through the motor 105. The adder 1305 derives a current error by subtracting the output from the motor current detector 1304 from the target current that is outputted from the current limiter 1303. The output from the adder 1305 is inputted to the loop filter 1306. The loop filter 1306 is provided to stabilize the current feedback response characteristics. For example, by using an integral filter, a first-order lag filter, or the like, a response speed is set to be sufficiently faster than the servo response speed.

The duty cycle converter 1307 generates a duty code by multiplying the output from the loop filter 1306 by the "duty cycle/current" coefficient.

The slew rate limiter 1308 performs a well-known slew rate limiting process on the output from the duty cycle converter 1307, and outputs the result to the PWM code generator 1217. The PWM code generator 1217 is configured in a manner similar to that in Embodiment 1.

In this way, even with the current feedback control system, a motor drive control similar to that in Embodiment 1 can be performed.

The first-order gain Gvs1 is about ½, for example, and is about ⅛ when the vicinity determining part 2054 and the like detect the vicinity. The second-order gain Gvs2 is from 0 to 1/32, for example, and is set to 0 to about 1/128 when the vicinity determining part 2054 and the like detect the vicinity.

Other Embodiments

Figure 1:
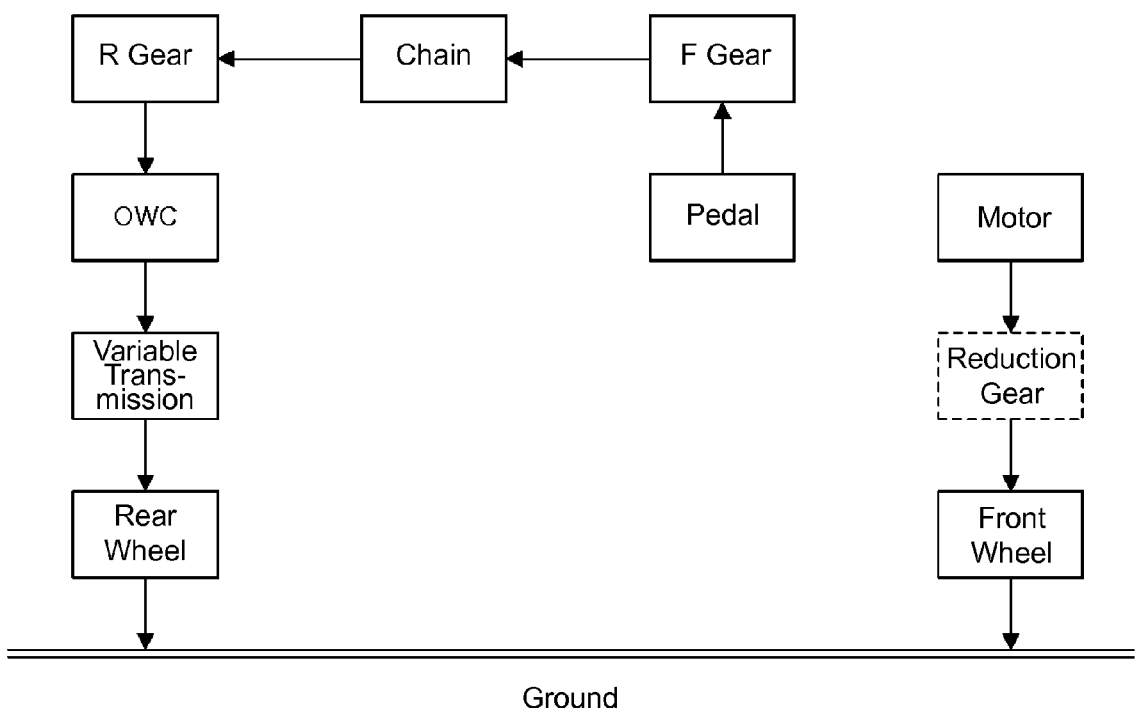
FIG. 1 is a drawing for describing one example of a power transmission system.
Figure 2:
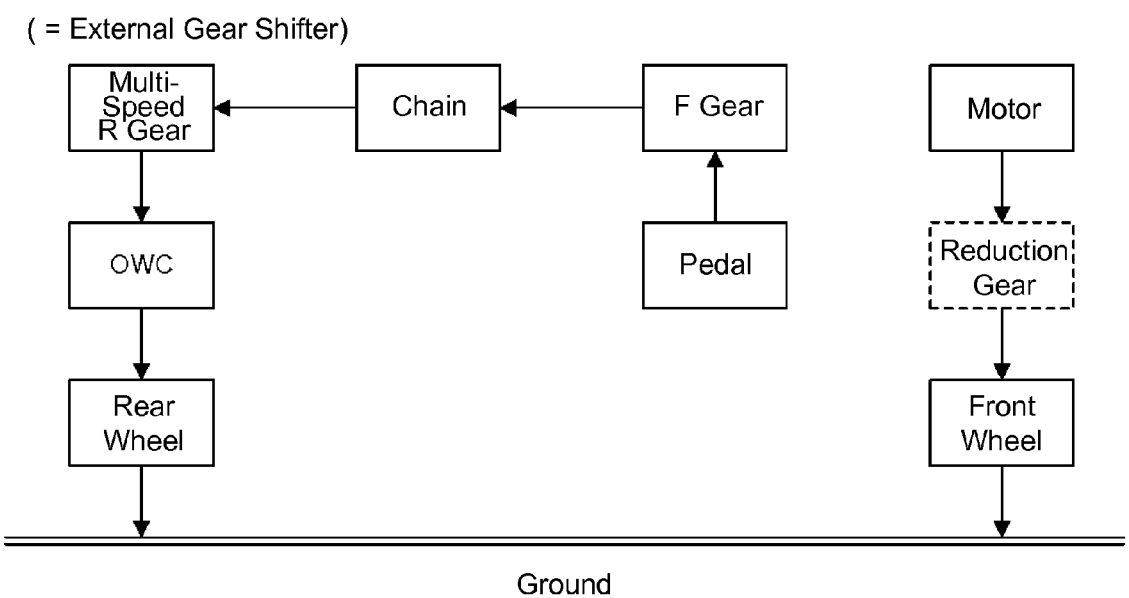
FIG. 2 is a drawing for describing one example of a power transmission system.
Figure 3:
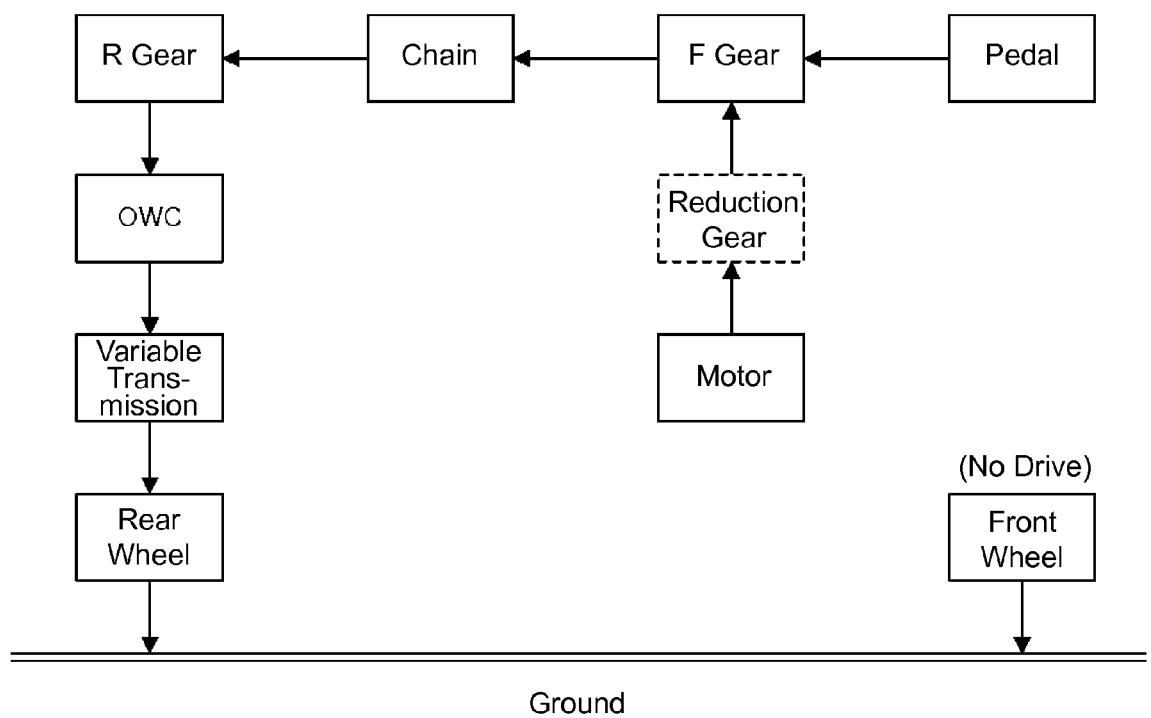
FIG. 3 is a drawing for describing one example of a power transmission system.
Figure 4:
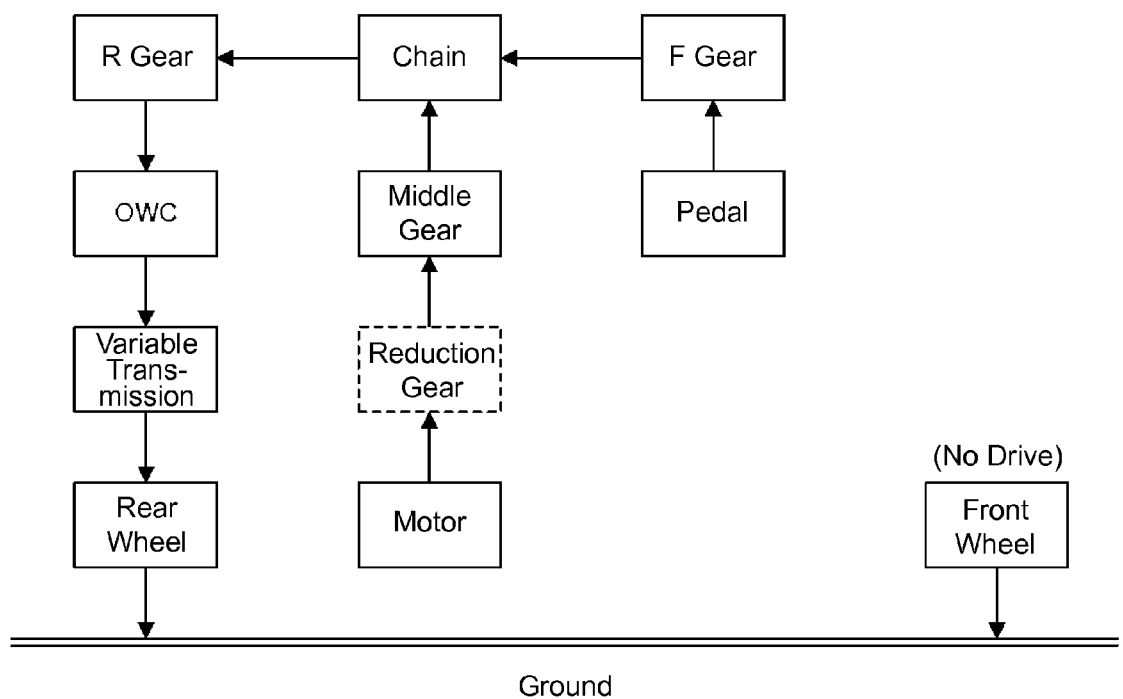
FIG. 4 is a drawing for describing one example of a power transmission system.
Figure 5:
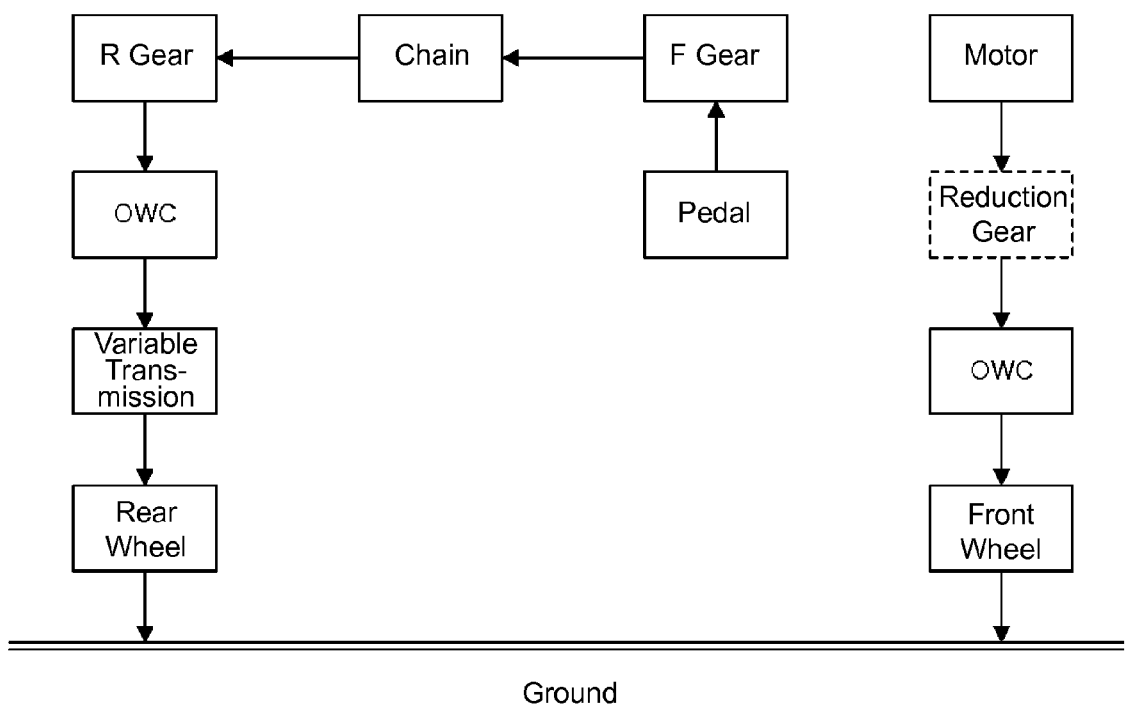
FIG. 5 is a drawing for describing one example of a power transmission system.
Figure 6:
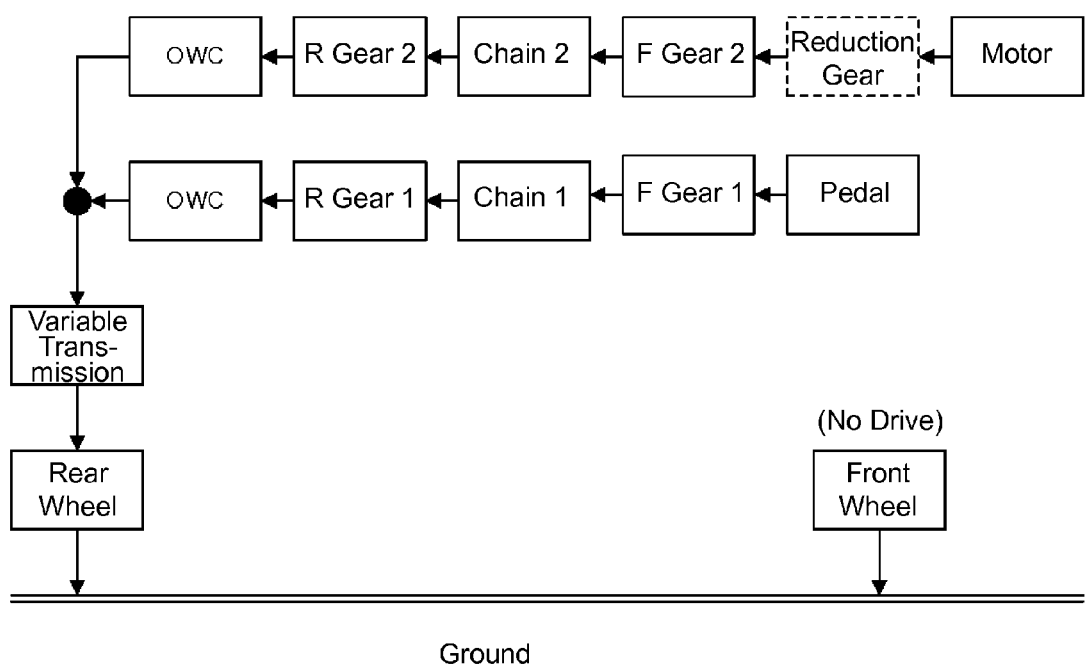
FIG. 6 is a drawing for describing one example of a power transmission system.

Embodiments 1 and 2 described the example of an electric power-assisted vehicle that has a power transmission system shown in FIG. 5. However, even with the power transmission system shown in FIG. 6, the motor drive controller similar to those in Embodiments 1 and 2 can be installed. In this case, the controller may be configured such that the servo gain is decreased around when the pedal rotation conversion speed and the motor speed coincide with each other. This makes it possible to prevent a shock caused by the motor being engaged to the one-way clutch.

Embodiments of the present invention were described above, but the present invention is not limited thereto. For example, in the function block diagrams described above, each block represents each function for ease of explanation, but the actual circuit configuration may differ, and when these functions are achieved through programs, these diagrams do not necessarily correspond to the actual program module configuration. In addition, there are a plurality of specific calculation methods for realizing the above-mentioned functions, any of which may be used.

In some cases, functions of portions of the calculating part 1021 are realized by specialized circuits, and in other cases, such functions are provided through programs executed by a microprocessor.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

The invention claimed is:

1. A motor drive control device for an electric power-assisted vehicle provided with a motor drive system and a pedal drive system each of which is provided with a one-way clutch, the device comprising:
 a first calculating part that calculates a pedal rotation conversion speed that is converted from a pedal rotation;
 a second calculating part that, during a period in which a first target torque is not detected, calculates a second target torque for a motor based on the pedal rotation conversion speed, the first target torque being calculated based on a pedal torque;
 a first processing part that generates a first value by converting a rotational speed of the motor to a duty cycle;
 a second processing part that generates a second value by converting the second target torque to a duty cycle; and
 a driver that controls switching of a switch provided in a complementary switching amplifier, based on an average duty cycle derived from a sum of the first value and the second value, the driver driving a motor that is connected to the complementary switching amplifier,
 wherein the second calculating part calculates the second target torque in accordance with the first target torque during a period in which the first target torque is detected.

2. The motor drive control device according to claim 1, wherein the second calculating part calculates the second target torque for the motor, based on a difference between speed of the motor and a target motor speed that is a smaller of the pedal rotation conversion speed and a vehicle speed.

3. The motor drive control device according to claim 2, wherein, when a difference between the target motor speed and a rotational speed the motor, which is a value obtained by subtracting the rotational speed of the motor from the target motor speed, is a negative value or when a pedal is stopped, the second calculating part stops a drive of the motor.

4. The motor drive control device according to claim 2, wherein, when an absolute value of a difference between the target motor speed and a rotational speed of the motor is smaller than a prescribed value, the second calculating part multiplies the difference between the target motor speed and the rotational speed of the motor by a gain that is smaller than that of when an absolute value of a difference between the target motor speed and the rotation speed of the motor is equal to or greater than the prescribed value.

5. The motor drive control device according to claim 2, wherein, when an absolute value of a difference between the target motor speed and a rotational speed of the motor is smaller than a prescribed value, the second calculating part outputs, as the second target torque, a smaller of a first value and a predetermined second value, the first value being derived from the difference between the target motor speed and the rotational speed of the motor.

6. The motor drive control device according to claim 1, wherein the second calculating part outputs the second target torque right after the first target torque is detected, the second target torque outputted by the second calculating part being gradually changed from a first value calculated based on the pedal rotation conversion speed to a second value calculated based on the pedal torque.

7. The motor drive control device according to claim 1, wherein the electric power-assisted vehicle does not have a variable transmission, or drives wheels via a variable transmission that is shared by a pedal and the motor, and
 wherein, when an absolute value of a difference between the pedal rotation conversion speed and a rotational speed of the motor is smaller than a prescribed value, the difference between the pedal rotation conversion speed and the rotational speed of the motor is multiplied by a gain that is smaller than that of when an absolute value of a difference between the pedal rotation conversion speed and a rotational speed of the motor is equal to or greater than the prescribed value.

8. The motor drive control device according to claim 1, wherein the pedal rotation conversion speed is derived from a pedal rotation based on a fastest gear ratio.

9. The motor drive control device according to claim 1, further comprising:
 a coefficient calibrating part that conducts, during a period in which the first target torque is not detected, a process of calibrating a coefficient that is used when converting a rotational speed of the motor to a duty cycle by calculating the second target torque such that a motor speed becomes a prescribed speed at a prescribed timing.

10. A motor drive control device for an electric power-assisted vehicle provided with a motor drive system and a pedal drive system each of which is provided with a one-way clutch, the device comprising:
 a first calculating part that calculates a pedal rotation conversion speed that is converted from a pedal rotation; and
 a second calculating part that, during a period in which a first target torque is not detected, calculates a second target torque for a motor based on the pedal rotation conversion speed, the first target torque being calculated based on a pedal torque, wherein the second calculating part calculates the second target torque in accordance with the first target torque during a period in which the first target torque is detected, wherein the second calculating part outputs the second target torque right after the first target torque is detected, the second target torque outputted by the second calculating part being gradually changed from a first value calculated based on the pedal rotation conversion speed to a second value calculated based on the pedal torque, and wherein the second calculating part increases the first value calculated based on the pedal rotation conversion speed to the second value calculated based on the pedal torque at a prescribed slew rate, when the first value is smaller than the second value.

11. A motor drive control device for an electric power-assisted vehicle provided with a motor drive system and a pedal drive system each of which is provided with a one-way clutch, the device comprising:

a first calculating part that calculates a pedal rotation conversion speed that is converted from a pedal rotation; and a second calculating part that, during a period in which a first target torque is not detected, calculates a second target torque for a motor based on the pedal rotation conversion speed, the first target torque being calculated based on a pedal torque, wherein the second calculating part calculates the second target torque for the motor, based on a difference between speed of the motor and a target motor speed that is a smaller of the pedal rotation conversion speed and a vehicle speed, and wherein, when a difference between the target motor speed and a rotational speed of the motor, which is a value obtained by subtracting the rotational speed of the motor from the target motor speed, is a negative value, the second calculating part multiplies the difference between the target motor speed and the rotational speed of the motor by a gain that is less than 1 and that is smaller than that of when the difference between the target motor speed and the rotational speed of the motor is a positive value.

* * * * *